US009780985B1

(12) United States Patent
Tom et al.

(10) Patent No.: US 9,780,985 B1
(45) Date of Patent: Oct. 3, 2017

(54) SUPPRESSING ALIGNMENT FOR OUT-OF-BAND INTERFERENCE AND PEAK-TO-AVERAGE POWER RATIO REDUCTION IN OFDM SYSTEMS

(71) Applicants: Anas Tom, Tampa, FL (US); Alphan Sahin, Seaford, NY (US); Huseyin Arslan, Tampa, FL (US)

(72) Inventors: Anas Tom, Tampa, FL (US); Alphan Sahin, Seaford, NY (US); Huseyin Arslan, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 15/151,998

(22) Filed: May 11, 2016

Related U.S. Application Data

(60) Provisional application No. 62/159,631, filed on May 11, 2015.

(51) Int. Cl.
*H04K 1/10* (2006.01)
*H04L 27/26* (2006.01)
(Continued)

(52) U.S. Cl.
CPC ......... *H04L 27/2614* (2013.01); *H04B 15/00* (2013.01); *H04B 17/336* (2015.01); *H04L 5/0007* (2013.01)

(58) Field of Classification Search
CPC ............... H04L 27/2614; H04L 5/0007; H04L 27/2601; H04L 2025/03414; H04L 1/0041;
(Continued)

(56) References Cited

U.S. PATENT DOCUMENTS 6,628,726 B1  9/2003  Breiling
7,072,413 B2 *  7/2006  Walton ................ H04B 7/0417
                                                        370/329
(Continued)

OTHER PUBLICATIONS

Yuan Jiang, "New Companding Transform for PAPR Reduction in OFDM", IEEE Communications Letters, vol. 14, No. 4, (Apr. 2010).
(Continued)

*Primary Examiner* — Khanh C Tran
(74) *Attorney, Agent, or Firm* — Thomas|Horstemeyer, LLP

(57) ABSTRACT

Various examples are provided for OOB interference and/or PAPR reduction in OFDM systems. In one example, a method includes generating a suppressing signal using channel state information (CSI) of a communication channel, where the length of the suppressing signal equals that of the OFDM symbol including a cyclic prefix (CP) and data portion; combining the OFDM symbol and the suppressing signal to generate a transmission signal, where the length of the suppressing signal is aligned with the length of the OFDM symbol; and communicating the transmission signal via the communication channel, which reduces and substantially aligns the length of the suppressing signal with a length of the CP at a receiving device. The CP and suppressing signal can be removed from the transmitted signal at the receiver using a CP removal matrix. In another example, a transmitting device includes OFDM encoding, signal suppression, combining circuitry to generate the transmission signal.

20 Claims, 19 Drawing Sheets

(51) Int. Cl.
*H04L 5/00* (2006.01)
*H04B 15/00* (2006.01)
*H04B 17/336* (2015.01)

(58) Field of Classification Search
CPC . H04L 25/0202; H04L 27/2662; H04B 15/00; H04B 17/336; H04B 2201/70706
See application file for complete search history.

(56) References Cited

U.S. PATENT DOCUMENTS

| | | | |
|---|---|---|---|
| 7,949,059 B2 | 5/2011 | Devlin et al. | |
| 8,185,065 B2 | 5/2012 | McCallister et al. | |
| 8,483,300 B2 | 7/2013 | Omidi et al. | |
| 8,571,136 B1 | 10/2013 | Mahmoud et al. | |
| 8,665,975 B2* | 3/2014 | Kim | H04B 7/043 370/203 |
| 8,891,430 B1 | 11/2014 | Sahin et al. | |
| 9,319,253 B2 | 4/2016 | Sahin et al. | |
| 2008/0043865 A1* | 2/2008 | Kim | H04B 7/0417 375/260 |
| 2009/0017769 A1* | 1/2009 | Chen | H04B 7/0417 455/69 |
| 2009/0116589 A1* | 5/2009 | Zhang | H04L 1/0003 375/341 |
| 2009/0274230 A1* | 11/2009 | Heath, Jr. | H04B 7/0634 375/260 |
| 2012/0147985 A1* | 6/2012 | Li | H04B 7/0639 375/285 |

OTHER PUBLICATIONS

May et al., "Reducing the Peak-To-Average Power Ratio in OFDM Radio Transmission Systems", Vehicular Technology Conference, 1998. VTC 98. 48th IEEE. vol. 3. IEEE, (May 1998).

Saini et al., "Peak to Average Power ratio reduction in OFDM system by clipping and filtering." International Journal of Electronics Communication and Computer Technology 2.3 (May 2012).

Jiang et al., "An Overview: Peak-to-Average Power Ratio Reduction Techniques for OFDM Signals", IEEE Transactions on Broadcasting, vol. 54, No. 2 (Jun. 2008).

Tom et al., "Suppressing Alignment: Joint PAPR and Out-of-Band Power Leakage Reduction for OFDM-Based Systems", IEEE Transactions on Communications vol. 64 No. 3, Mar. 2016 (online Dec. 2015)).

Tom et al., "Suppressing Alignment: An Approach for Out-of-Band Interference Reduction in OFDM Systems", Communications (ICC), 2015 IEEE International Conference on. IEEE, Jun. 2015.

Qin et al., "Power Allocation and Time-Domain Artificial Noise Design for Wiretap OFDM with Discrete Inputs" Accepted by IEEE Transactions on Wireless Communications, Mar. 2013.

Maso et al., "A Composite Approach to Self-Sustainable Transmissions: Rethinking OFDM", IEEE Transactions on Communications, vol. 62, No. 11, Nov. 2014.

* cited by examiner

US 9,780,985 B1

SUPPRESSING ALIGNMENT FOR OUT-OF-BAND INTERFERENCE AND PEAK-TO-AVERAGE POWER RATIO REDUCTION IN OFDM SYSTEMS

CROSS REFERENCE TO RELATED APPLICATIONS

This application claims priority to, and the benefit of, U.S. provisional application entitled "SUPPRESSING ALIGNMENT FOR OUT-OF-BAND INTERFERENCE REDUCTION IN OFDM SYSTEMS" having Ser. No. 62/159,631, filed May 11, 2015, which is hereby incorporated by reference in its entirety.

BACKGROUND

Orthogonal frequency division multiplexing (OFDM) is a multi-carrier transmission scheme used in most of the existing wireless (broadband communication) standards such as LTE, WFi, WiMAX and IEEE 802.20 WRAN. The popularity of OFDM comes from the multitude of benefits it offers in terms of providing high data rate transmission and spectral efficiency, robustness against and tolerance to multipath fading, ease of implementation, simple equalization and waveform agility. OFDM signals are agile in the sense that any subcarrier can be switched on or off to fit the available transmission bandwidth, which makes it well suited for systems with dynamic spectrum access. Nonetheless, and despite all the aforementioned advantages, OFDM signals have out-of-band (OOB) power leakage as a result of high spectral sidelobes that can create severe interference to users in adjacent transmission bands and high peak-to-average power ratio (PAPR). The high spectral sidelobes are due to the use of rectangular windowing in generating OFDM signals, which have a sinc-like shape in the frequency domain that decays slowly as $f^{-2}$. Both shortcomings can impact the performance of OFDM and can limit its practical applications.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figures 1A, 1B:
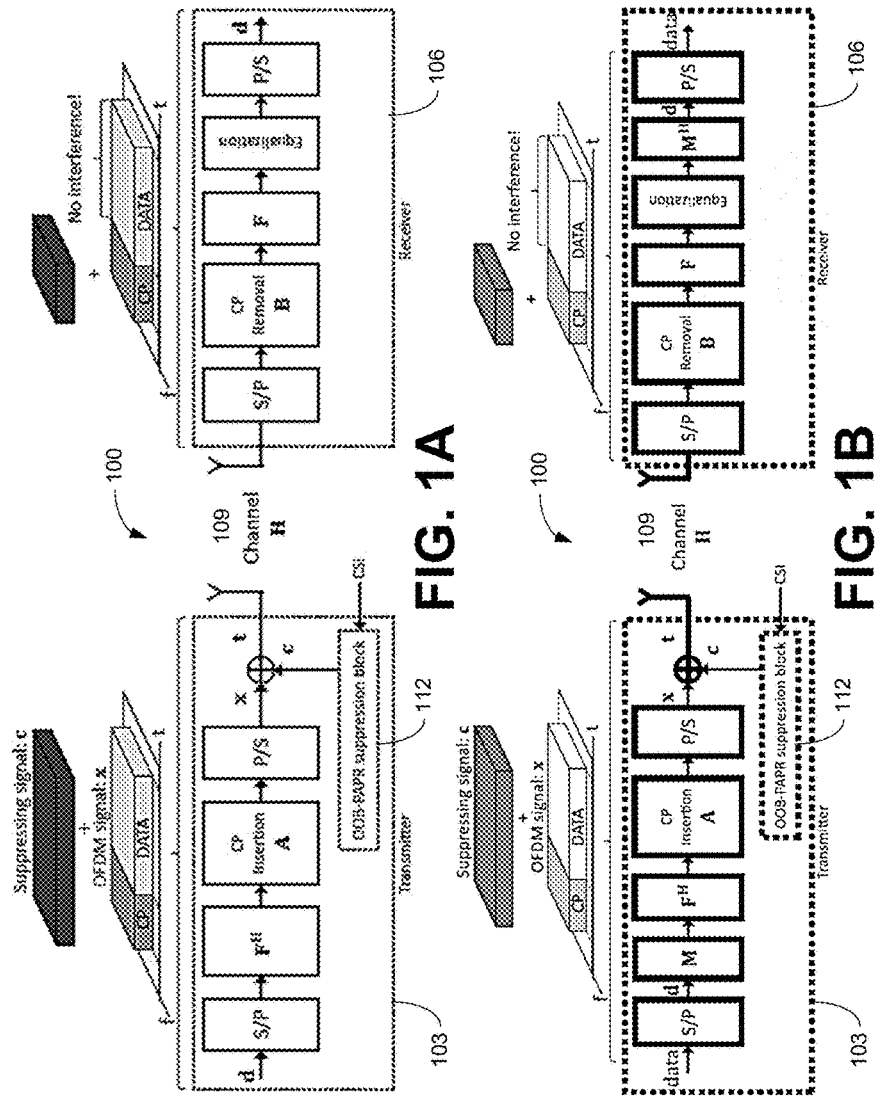
FIGS. 1A and 1B are examples of an orthogonal frequency division multiplexing (OFDM) system with suppressing alignment in accordance with various embodiments of the present disclosure.

Disclosed herein are various examples related to out-of-band (OOB) interference reduction in orthogonal frequency division multiplexing (OFDM) systems. Reference will now be made in detail to the description of the embodiments as illustrated in the drawings, wherein like reference numbers indicate like parts throughout the several views.

The literature is rich with algorithms that address the high out-of-band (OOB) leakage of OFDM signals. Traditional time domain windowing has been proposed as a simple method of suppressing the spectral sidelobes by smoothing the transitions between successive OFDM symbols. Windowing algorithms, although simple, suffer from a reduced spectral efficiency due to the added window extensions, especially when the added guard interval is large. A slightly more complex approach that adaptively smooths the symbol transitions has also been considered. There, better OOB leakage reduction is obtained, but nonetheless, the algorithm has the same limitation of a spectral efficiency loss as traditional windowing. In addition, the use of cancellation tones for spectral emission reduction has been proposed. These algorithms are primarily based on allocating several subcarriers, that carry no data information, but rather optimized complex weights calculated solely for canceling the interference in adjacent channels.

Cancellation algorithms are very effective in reducing the OOB leakage, however they generally suffer from a signal-to-noise ratio (SNR) loss at the receiver due to the power consumed by the cancellation subcarriers. A subset of subcarriers, modulated with optimized complex weights, can be reserved primarily for suppressing the spectral sidelobes of the transmitted signal. Furthermore, since the cancellation tones are essentially dummy tones that carry no information, the reduction in the OOB leakage always comes at the expense of a reduced transmission rate. Another approach termed subcarrier weighting (SW) is where all subcarriers are weighted with complex coefficients calculated with the goal of having a transmitted signal with lower OOB emissions. Unlike the cancellation algorithms or time domain windowing, SW does not reduce the spectral efficiency as all subcarriers are utilized for data transmission. Nevertheless, it degrades the bit error rate (BER) performance of the transmitted signal as some subcarriers are weighted less than others, which ultimately translates to a lower SNR on those subcarriers.

Precoding, which was historically investigated for mitigating the channel fading effects, has also recently been considered for the reduction of the OOB interference. The spectral emissions can be reduced by introducing some distortion on the data symbols. These precoders maintain the transmission rate, but they degrade the BER performance. Orthogonal precoding with an error performance similar to legacy OFDM has been reported. The error performance is maintained by trading-off the spectral efficiency. In general, precoding algorithms or schemes are very effective in reducing the OOB leakage and can produce a significant reduction in the OOB leakage, however they result in either error performance degradation or reduction in the transmission rate. Non-orthogonal precoders can destroy the orthogonality between the OFDM subcarriers, resulting in error performance degradation at the receiver. In the other hand, orthogonal precoders may maintain the same error performance as plain OFDM by sacrificing the spectral efficiency. Also, most precoders induce some change in the receiver structure of legacy OFDM.

A common theme among all of the aforementioned algorithms is that they either degrade the error performance or reduce the spectral efficiency. In this disclosure, a suppressing alignment approach is presented for reducing the OOB interference in OFDM based systems. This approach does not have any limitation in terms of spectral efficiency loss and maintains an error performance similar to legacy OFDM. The unavoidable redundancy provided by the cyclic prefix (CP) and the wireless channel can be exploited to generate a suppressing signal, that when added to the OFDM signal, results in a marked reduction in the OOB interference. Moreover, the suppressing signal is aligned with the CP duration at the receiver after passing through the wireless channel. In essence, the suppressing signal can create zero interference to the information symbols carried by the OFDM signal. Hence, the error performance of the suppressing alignment approach is similar to that of an ideal OFDM transmission. Additionally, in contrast to prior OOB reduction algorithms, the suppressing alignment does not change the receiver structure of legacy OFDM. This approach exploits the degrees of freedom provided by the CP and the wireless channel for spectral emissions reduction without degrading the error performance or reducing the spectral efficiency.

In addition to the high spectral sidelobes, high peak-to-average power ratio (PAPR) is another problem that is common to all multicarrier transmission schemes including OFDM. The PAPR problem arises from the fact that OFDM signals are composed of multiple subcarriers with independent amplitudes and phases, that when added together, are more likely to generate a signal with high peak power. Such peak power may lead to the signal being severely clipped, especially if it exceeds the linear region of operation of the transmitter power amplifier (PA). Signal clipping creates serious inband distortion that ultimately results in large degradation in the bit error rate (BER) performance at the receiver. Besides the inband distortion, high PAPR leads also to spectral spreading, which is commonly referred to as OOB spectral regrowth. All of the aforementioned spectral suppression algorithms ignore the issue of high PAPR, an inherent characteristic of OFDM waveforms. As a result, the gains in OOB leakage reduction provided by these algorithms might be misleading, i.e., the spectral sidelobes can potentially grow back up after the high peak power transmitted signal passes through the PA. The suppressing alignment approach can also provide for joint suppression of both the OOB leakage and PAPR without any reduction in the transmission rate.

Suppressing alignment exploits the temporal degrees of freedom provided by the cyclic prefix (CP), a necessary redundancy in OFDM systems, to properly design a suppressing signal that can effectively reduce both the OOB power leakage and PAPR of the OFDM signal. In particular, the suppressing alignment approach adds another dimension to the use of the CP. Traditionally, the CP has been exploited mainly to mitigate the impact of inter-symbol interference (ISI) in multipath fading channels. In this disclosure, that functionality can be extended by also utilizing the CP for the purpose of spectral emissions suppression and PAPR reduction. Besides exploiting the CP, the wireless channel can also be utilized to align the generated suppressing signal with the CP duration of the OFDM symbol at the receiver. By doing so, the suppressing signal will not cause any interference to the data portion of the OFDM symbol. From an interference point of view, the data carried in the OFDM symbol appears to be corrupted by the suppressing signal at the transmitter. However, after passing through the channel, the suppressing signal is perfectly aligned with the CP. In light of such alignment, the data portion of the OFDM symbol appears completely free of interference to the receiver. Thus, after discarding both the CP and the aligned suppressing signal through a simple CP removal operation, the receiver can decode the data with an error performance similar to that of standard OFDM. In addition to maintaining a spectral efficiency and error performance similar to plain OFDM, the suppressing alignment approach does not require any change in the receiver structure of legacy OFDM.

This disclosure will introduce a system model, followed by the concept of suppressing alignment and its application to the joint reduction of OOB leakage and PAPR, and finally numerical results are presented.

Notations:

$I_N$ is the N×N identity matrix; $O_{N\times M}$ is an all zeros N×M matrix. The transpose and conjugate transpose are denoted by $(\bullet)^T$ and $(\bullet)^H$, respectively, and $\|\bullet\|_2$ denotes the 2-norm. $E[\bullet]$ denotes the expectation operator while ker ($\bullet$) denotes the kernel of the matrix. The field of real and field of complex numbers are represented by $\mathbb{R}$ and $\mathbb{C}$, , respectively. $\mathcal{CN}(\mu,\Sigma)$ is the complex Gaussian distribution with mean $\mu$ and covariance matrix $\Sigma$.

System Model

Referring to FIG. 1A, shown is an example of a system model of an OFDM transmitter and receiver with suppressing alignment. Consider a single link OFDM system 100 comprising a transmitter (or transceiver) 103 and a receiver (or transceiver) 106 communicating over a Rayleigh multipath channel 109 as illustrated in FIG. 1. For ease of analysis and without loss of generality, assume that there is an adjacent user, employing OFDM or any other technology, operating over a bandwidth spanned by K subcarriers within the transmission band of the OFDM system 100. The OFDM transmitter 103/receiver 106 pair should control their transmissions such that minimal interference is caused to this adjacent user. Let the total number of subcarriers be N, where subcarriers $\{i+1, \ldots, i+K\}$ are disabled (or deactivated) in order not to cause any interference to the user transmitting over those subcarriers. The rest of the $N_d$ active subcarriers $\{1, \ldots, i\} \cup \{i+K+1, \ldots, N-1\}$, whereas the DC subcarrier is disabled, are modulated by the set of the QAM symbols contained in the vector $d \in \mathbb{C}$, .

Furthermore, let the CP size (or length) be L samples, which is assumed to be longer than the maximum delay spread of the channel 109, be added to the start of the OFDM symbol to mitigate the effects of intersymbol interference (ISI). Accordingly, the resulting time domain OFDM signal can be expressed as:

$$x=[x_1, \ldots, x_{N+L}]^T=AF^Hd \quad (1a)$$

where F is the N-point discrete Fourier transformation (DFT) matrix, and $A \in \mathbb{R}^{(N+L) \times N}$ is the CP insertion matrix defined as:

$$A = \begin{bmatrix} 0_{L \times N-L} & I_L \\ I_N & \end{bmatrix}. \quad (2)$$

In an alternative embodiment, this can be modeled by including a subcarrier mapping matrix $M \in \mathbb{R}^{N \times N_d}$ containing the $N_d$ columns of $I_N$ corresponding to the active data subcarriers. Using this, the resulting time domain OFDM signal can be expressed as:

$$x=[x_1, \ldots, x_{N+L}]^T=AF^HMd. \quad (1b)$$

FIG. 1B shows an example of the system model of the OFDM transmitter and receiver with suppressing alignment including the subcarrier mapping matrix M.

To control the spectral emissions of the transmitted signal as well as its PAPR, the OOB-PAPR suppression block 112 generates a time domain signal $c=[c_1, \ldots, c_{N+L}]^T$, which can be referred to as a suppressing signal. The suppressing signal c has the same length as the OFDM signal in EQNS. (1 a) and (1b), i.e., $c \in \mathbb{C}^{(N+L) \times 1}$. Let the suppressing signal c be expressed as:

$$c=Ps, \quad (3)$$

where $P \in \mathbb{C}^{(N+L) \times L}$ and $s \in \mathbb{C}^{L \times 1}$. The transmitted signal is then given by:

$$t=x+c=AF^H d+Ps, \quad (4a)$$

or $$t=x+c=AF^H Md+Ps. \quad (4b)$$

where x is defined in EQN. (1a) or (1b), respectively. The suppressing signal c=Ps can be designed to suppress both the spectral sidelobes and PAPR of the transmitted signal.

Suppressing Alignment

The concept of suppressing alignment is based on generating a non-interfering signal by exploiting the CP, a necessary redundancy in OFDM systems, as well as the wireless channel 109 between the transmitter 103 and the receiver 106. The suppressing signal c in EQN. (3) can be constructed so that the transmitted signal has better spectral emissions (better OOB radiation) compared to conventional OFDM signals. Essentially, the suppressing signal c is aligned or substantially aligned with the CP duration at the receiver 106 after the transmitted signal passes through the channel 109 as shown in FIG. 1. With such a design, the suppressing signal c causes no interference to the data symbols carried by the OFDM signal x.

More specifically, the suppressing signal c or equivalently (Ps) is designed with two goals: 1) to minimize the OOB power leakage, as well as the PAPR, of the transmitted signal in the adjacent band and 2) to avoid causing any interference to the information data carried by the OFDM symbol, in the sense that the receiver 106 is able to recover all information data sent by the transmitter 103. This may be done without affecting the error performance or the receiver structure of the legacy OFDM system. In the subsequent discussion, the vector s will be designed to fulfill the first goal while the matrix P will be designed to satisfy the latter goal. For example, s can be designed to suppress the spectral sidelobes and/or the PAPR of the transmitted signal, while P can be primarily constructed to generate a non-interfering suppressing signal.

First, consider the design of the matrix P. Since the suppressing signal is added to the OFDM signal before transmission in EQNS. (4a) and (4b), the information data carried by the OFDM signal is distorted and the receiver 106 might not be able to recover the data if the suppressing signal is not properly designed. To achieve such proper design, the received signal can be examined at the receiver 106 after passing through the channel 109.

Let the channel 109 between the transmitter 103 and receiver 106 be an i.i.d. Rayleigh multipath channel given as $h=[h_0, \ldots, h_l] \sim \mathcal{CN}(0, I_{l+1}/(l+1))$. The received signal is a linear convolution of the channel 109 and the transmitted signal in EQN. (4), e.g. r=h*t. By expressing the channel 109 as a Toeplitz matrix, this linear convolution can be written as:

$$r=Ht+n, \quad (5)$$

where $H \in \mathbb{C}^{(N+L) \times (N+L)}$ is a Toeplitz matrix given by:

$$H = \begin{bmatrix} h_0 & 0 & \ldots & 0 & h_l & \ldots & h_1 \\ \vdots & \ddots & \ddots & \ddots & \ddots & \ddots & \vdots \\ \vdots & \ddots & \ddots & \ddots & \ddots & \ddots & h_l \\ h_l & \ldots & \ldots & h_0 & 0 & \ldots & 0 \\ 0 & \ddots & \ddots & \ddots & \ddots & \ddots & \vdots \\ 0 & \ddots & 0 & h_l & \ldots & \ldots & h_0 \end{bmatrix}, \quad (6)$$

and $n \in \mathbb{C}^{(N+L) \times 1} \sim \mathcal{CN}(0, \sigma^2 I_{N+L})$ is an additive white Gaussian noise (AWGN) vector. Assuming perfect synchronization between the transmitter 103 and receiver 106, and after the serial-to-parallel (S/P) conversion, the receiver 106 removes the first L CP samples and then applies a DFT. Using EQNS. (1a)-(4a), the received signal after CP removal can be given by:

$$y=BHt=BHAF^H d+BHPs+\bar{n}, \quad (7a)$$

where $B \in \mathbb{R}^{N \times (N+L)}$ is the CP removal matrix defined as $$B=[0_{N \times L} I_N], \quad (8)$$

and $\bar{n} \in \mathbb{C}^{N \times 1}$ is the resulting noise vector after the removal of the first L samples from n. Before equalization and data detection, the vector y is passed to the DFT block. The result after the DFT transformation can be given by:

$$\tilde{y}=FBHAF^H d+FBHPs+\hat{n}, \quad (9)$$

where $\hat{n}$ is the noise vector after applying the DFT. Using EQNS. EQNS. (1b)-(4b), the received signal after CP removal can be given by:

$$y=FBHt+\bar{n}=FBHAF^H Md+FBHPs+\bar{n}, \quad (7b)$$

where $B \in \mathbb{R}^{N \times (N+L)}$ is the CP removal matrix and $\bar{n} \in \mathbb{C}^{N \times 1}$ is the resulting noise vector after removing the first L samples from n and applying the DFT.

The design of the matrix P can be addressed by examining EQN. (9) or EQN. (7b). As stated before, the goal in designing P is that the interference caused by the added suppressing signal should be zero at the receiver 106. In a legacy OFDM receiver, the received signal consists of only the first and last terms in EQN. (9). Thus, to maintain the same error performance as conventional OFDM without modifying the receiver structure, the second term in EQN. (9) has to be zero, i.e., $$FBHPs=0. \quad (10)$$

If EQN. (10) is true, the suppressing signal c=Ps would generate zero interference to the information data carried by the OFDM signal regardless of the value of s. In fact, since the CP removal matrix throws away the CP samples and leaves only the data part of the OFDM signal, EQN. (10) is equivalent to aligning the suppressing signal with the CP duration, which will be thrown away along with the CP, leaving a clean data part within the received signal as illustrated in FIG. 1. If EQN. (10) is satisfied, then the received vector in EQN. (9) or EQN. 7(b) becomes similar to legacy OFDM received data and the receiver 106 would be able to apply single-tap equalization to recover the information symbols. Essentially, the information data in the vector d experiences zero interference from the suppressing signal.

As a side note, with knowledge of the channel state information (CSI) the transmitter 103 and receiver 106 can maintain an interference-free communication, which is a valid assumption in a legitimate transmitter-receiver pair, since the CSI is usually communicated from the receiver 106 to the transmitter 103. On the other hand, without knowledge of the CSI, the suppressing signal will not align with the CP at the receiver 106 rendering the received signal undecodable. Therefore, another advantage of the suppressing alignment method is that it generates transmitted signals that are secure.

Assuming perfect CSI at the transmitter 103, EQN. (10) can be realized if the matrix P is in (or belongs to) the null space of BH, i.e., ker (BH), then EQN. (10) is satisfied regardless of the value of the vector s. Using the rank-nullity theorem, the dimension of the null-space of BH$\in$C,$^{N\times(N+L)}$ is obtained as dim (ker (BH))=N+L−rank (BH)=L, since rank (BH)=N. Accordingly, if the columns of P span these L dimensions of ker (BH), then the condition of EQN. (10) holds true and the receiver 106 can recover the data using legacy OFDM reception. Accordingly, P is designed such that:

$$\text{span}(P) = \text{ker}(BH). \tag{11}$$

This is can be done by constructing (or choosing) the columns of P as an orthogonal basis for the subspace spanned by ker (BH), which can be found using the singular value decomposition (SVD). Using the SVD, BH can be factorized as:

$$BH = U\Sigma V^H. \tag{12}$$

where U$\in$C,$^{N\times N}$, $\Sigma\in$C,$^{N\times(N+L)}$ is a diagonal matrix holding the singular values of BH, and V$\in$C,$^{(N+L)\times(N+L)}$. If V is expressed as:

$$V = [v_0 v_1 \ldots v_{N+L-1}], \tag{13}$$

then the last L columns of V constitute an orthogonal basis that spans the null space of BH, i.e., ker (BH), and thus P can be chosen as:

$$P = [v_N v_{N+1} \ldots v_{N+L-1}]. \tag{14}$$

Such construction of P allows interference free transmission and is in principle similar to interference alignment (IA). In particular, P aligns the interference from the suppressing signal to the portion of the OFDM symbol spanned by the CP as shown in FIGS. 1A and 1B.

Next consider the design of the vector s. First examine the interference caused by the transmitted signal of EQN. (4a) or (4b) over the K subcarriers occupied by the user in the adjacent band. The signal spectrum of the transmitted signal of EQN. (4a) or (4b) can be given as:

$$S_t = F_{\varsigma N,\beta}(AF^H d + Ps), \tag{15a}$$

or $$S_t = F_{\varsigma N,\beta}(AF^H Md + Ps), \tag{15b}$$

where $\varsigma$ is the upsampling factor, i.e., $\varsigma$ samples per subcarrier are considered, $\beta$=N+L, and $F_{\varsigma N,\beta}$ is an $\varsigma$N$\times\beta$ DFT matrix. Using EQN. (15a) or (15b), the interference created by the transmitted signal over the adjacent band can be expressed as:

$$\mathcal{J}_K = \mathcal{F}_K(AF^H d + Ps) = \underbrace{\mathcal{F}_K AF^H d}_{\mathcal{F}_d} + \underbrace{\mathcal{F}_K Ps}_{\mathcal{F}_s}, \tag{16a}$$

$$\mathcal{J}_K = \mathcal{F}_K(AF^H Md + Ps) = \underbrace{\mathcal{F}_K AF^H Md}_{\mathcal{F}_d} + \underbrace{\mathcal{F}_K Ps}_{\mathcal{F}_s}, \tag{16b}$$

where $\mathcal{J}_K$ is a sub-matrix of $F_{\varsigma N,\beta}$ containing only the rows that correspond to the subcarriers occupied by the adjacent user. The first term in EQNS. (16a) and (16b) represents the OOB power leakage from the information data and the second term is the OOB power leakage from the suppressing signal c. To minimize the interference power $\mathcal{J}_K$ in the adjacent band, s can be calculated such that:

$$s = \arg\min_s \|\mathcal{F}_d + \mathcal{F}_s s\|_2 \text{ subject to } \|s\|_2^2 \leq \epsilon, \tag{17}$$

where the power of the s is upper bounded by E, which is a power constraint on the vector s to avoid spending too much power on the suppressing signal. It is worth noting that the power of s is the same as (or equal to) the power of the suppressing signal c=Ps, since P is an orthogonal matrix.

The optimization problem in EQN. (17) is a least squares with quadratic inequality constraint (LSQI) problem. To solve this problem, first consider the unconstrained least squares problem, i.e., without the power constraint. The solution to the least squares problem is:

$$s = -(\mathcal{J}_s^H \mathcal{J}_s)^{-1} \mathcal{J}_s^H \mathcal{J}_d. \tag{18}$$

It is clear that the calculated s in EQN. (18) is also the solution to the problem in (17) if $\|s\|_2^2 \leq \epsilon$, and an analytical solution exists for this case. However, if $\|s\|_2^2 \geq \epsilon$, then there is no analytical solution and in order to solve the problem, consider the following unconstrained problem:

$$s = \arg\min_s \|\mathcal{F}_d + \mathcal{F}_s s\|_2 + \lambda_0 \|s\|_2^2, \tag{19}$$

where $\lambda_0 > 0$ is the Lagrange multiplier. The solution in this case is:

$$s = -(\mathcal{J}_s^H \mathcal{J}_s + \lambda_0 I)^{-1} \mathcal{J}_s^H \mathcal{J}_d. \tag{20}$$

For a proper Lagrange multiplier, which can be found using a bi-section search algorithm, $\|s\|_2^2 = \epsilon$. In alternative implementations, EQN. (17) can be solved numerically using many of the publicly available convex optimization solvers. For example, YALMIP integrated with MATLAB® can be used to obtain a numerical solution for s.

Joint PAPR and OOB Power Leakage Reduction

PAPR is an important metric for multi-carrier systems. Any increase in the PAPR might drive the power amplifier at the transmitter 103 to operate in a non-linear region. This can potentially cause spectral regrowth in the sidelobes, erasing any OOB reduction gains achieved before the power amplifier. Therefore, as an extension to the results in the previous section, the PAPR and OOB power leakage may be jointly minimized to avoid such problem.

The PAPR of the transmitted signal is the ratio of the maximum instantaneous power to the average power which is given as:

$$PAPR = \frac{\|t\|_\infty^2}{\frac{1}{(N+L)}\|t\|_2^2} = \frac{\|x + Ps\|_\infty^2}{\frac{1}{(N+L)}\|x + Ps\|_2^2}. \tag{21}$$

Accordingly, to minimize the OOB interference as well as the PAPR, the optimization problem in EQN. (17) can be extended as follows:

$$s = \underset{s}{\operatorname{argmin}}(1-\lambda)\|\mathcal{F}_d + \mathcal{F}_s s\|_2 + \lambda\|x + Ps\|_\infty, \quad (22)$$

subject to $\|s\|_2^2 \leq \epsilon$, where the weighting factor, $\lambda \in [0,1]$, is for controlling the amount of minimization for both OOB power leakage and PAPR. This adaptation parameter can be flexibly adjusted to emphasize one problem over the other depending on the system design requirements. For example, when $\lambda=0$, the objective function turns into a pure OOB power leakage reduction problem and EQN. (22) is equivalent to EQN. (17). On the other hand, EQN. (22) is a pure PAPR reduction problem when $\lambda=1$. Similar to EQN. (17), the amount of power consumed by the suppressing signal is controlled by $\epsilon$.

Both the objective function and the constraint in EQN. (22) are convex which renders the problem as a convex optimization problem that can be solved numerically by any convex optimization solver. For example, YALMIP, a free optimization package that is integrated with MATLAB®, and MOSEK can be utilized as the underlying solver to obtain a numerical solution to EQN. (22).

Imperfect Channel Estimation.

In practice, the assumption of perfect channel knowledge at the transmitter 103 (FIGS. 1A and 1B) might not be valid. The performance of the suppressing alignment algorithm may be analyzed when the transmitter has imperfect CSI. The channel 109 (FIGS. 1A and 1B) can be estimated at the receiver 106 (FIGS. 1A and 1B) and the CSI can be fed back to the transmitter 103. The transmitter 103 can then use this CSI to generate the suppressing signal c=Ps. To evaluate the impact of channel estimation errors, assume that the channel known at the transmitter 103 is different than the actual channel 109 that the signal is transmitted through. The noisy channel estimation can be modeled as:

$$\hat{H} = H + E, \quad (23)$$

where $E = \sigma_e \Omega$ is the channel error matrix and $\Omega$ is Toeplitz with the same structure as EQN. (6). The non-zero entries of $\Omega$ are i.i.d. complex Gaussian with zero mean and unit variance. The error in channel estimation can be quantified by the mean square error (MSE) $\sigma_e^2$ defined as:

$$\sigma_e^2 = \frac{\mathbb{E}\left[|\hat{h}_{ij} - h_{ij}|^2\right]}{\mathbb{E}\left[|h_{ij}|^2\right]}. \quad (24)$$

The received signal after the CP removal and DFT operation can be given by EQN. (7b), where the precoding matrix P is designed based on knowledge of the channel 109 at the transmitter 103. If the channel H communicated back to the transmitter 103 by the receiver 106 is erroneous, then P can be designed based on H as opposed to the true channel $\hat{H}$. Therefore, the second term in EQN. (7b) would not vanish, i.e., EQN. (10) is not true anymore. This effectively means that the suppressing signal leaks into the data part of the OFDM symbol instead of precisely being aligned with the CP duration. Nevertheless, the erroneous channel information does not affect the OOB power leakage and PAPR reduction performance of the suppressing alignment scheme, since the suppressing signal is still designed based on EQN. (17) or (22).

The average power leakage of the suppressing signal into the data part of the received OFDM symbol can be expressed as:

$$\xi = 1/N \mathbb{E}\left[\|B\hat{H}Ps\|_2^2\right]. \quad (25)$$

To evaluate the above the expression, we utilize the closed-form expression for s in EQN. (20), which after substituting $\mathcal{J}_d$ from EQN. (16b), can be written as:

$$s = -(\mathcal{J}_s^H \mathcal{J}_s + \lambda_0 I)^{-1} \mathcal{J}_s^H \mathcal{J}_K A F^H M d = \Phi d. \quad (26)$$

Substituting $\hat{H}$ from EQN. (23) and the above expression for s, the mean leaked power in EQN. (25) can be evaluated as:

$$\xi = \frac{1}{N}\mathbb{E}\left[tr[(B(H+E)P\Phi d)^H(B(H+E)P\Phi d)]\right] \quad (27)$$

$$= \frac{1}{N}\mathbb{E}\left[tr[d^H \Phi^H P^H (H+E)^H B^H B(H+E)P\Phi d]\right]$$

$$= \frac{1}{N}tr[\Phi^H P^H \mathbb{E}[(H+E)^H B^H B(H+E)]P\Phi \mathbb{E}[dd^H]].$$

Since BHP=0 and the data vector d is assumed to have zero mean and covariance $\mathbb{E}[dd^H]=I_{N_d}$, EQN. (27) arrives at:

$$\xi = \frac{1}{N}tr[\Phi^H P^H \mathbb{E}[E^H B^H B E]P\Phi] \quad (28)$$

$$= \frac{1}{N}tr[\mathbb{E}[EP\Phi\Phi^H P^H E^H]B^H B].$$

Let $Z = P\Phi\Phi^H P^H$, $Y = EZE^H$ and the projection matrix $G = B^H B$ defined as:

$$G = \begin{bmatrix} 0_{L \times L} & 0_{L \times N} \\ 0_{N \times L} & I_{N \times N} \end{bmatrix}. \quad (29)$$

Thus, $$\xi = 1/N tr[\mathbb{E}[Y]G]. \quad (30)$$

Using the definition for Y above as well as the Toeplitz property of the error matrix i.e., $E_{ij}=e_{i-j}$, the expectation in EQN. (30) can now be evaluated as:

$$\mathbb{E}[Y]_{ij} = \Sigma_{kl}\mathbb{E}[E_{ik}Z_{kl}E_{jl}^*] = \Sigma_{kl}\mathbb{E}[e_{i-k}Z_{kl}e_{j-l}^*]. \quad (31)$$

and since $\mathbb{E}[e_i e_j^*]=1/L\sigma_e^2 \delta'_{ij}$, then:

$$\mathbb{E}[Y]_{ij} = 1/L\sigma_e^2 \Sigma_{kl}\mathbb{E}[Z_{kl}\delta'_{i-k,j-l}]. \quad (32)$$

Due to the structure of the projection matrix G, it only selects entries with i=j=L+1, L+2, . . . , L+N. Accordingly, the final expression for the leaked power is arrived at:

$$\xi = \frac{1}{N}tr[\mathbb{E}[Y]G] = \frac{1}{LN}\sigma_e^2 \sum_{i=L+1}^{N+L}\sum_{k,l=1}^{N+L} Z_{kl}\delta'_{i-k,j-l} \quad (33)$$

$$= \frac{1}{LN}\sigma_e^2 \sum_{k=1}^{N+L} Z_{kk}\Psi_k.$$

where $\Psi_k = \Sigma_{i=L+1}^{N+L}\delta'_{i-k,i-k}$ and is equal to:

$$\Psi_k = \begin{cases} k-1 & 1 \leq k \leq L \\ L, & L+1 \leq k \leq N+1 \\ N+L-k+1, & N+2 \leq k \leq N+M \\ 0, & \text{otherwise} \end{cases}. \quad (34)$$

It is worth noting that the closed form expression in EQN. (33) represents the power leakage when only the OOB reduction is considered, but not the joint reduction of PAPR and OOB since a closed-form solution for the suppressing signal does not exist in the latter case. Alternatively, the power leakage in the case of joint reduction of OOB and PAPR can be evaluated through simulation.

Synchronization.

Another factor for proper operation of the proposed method is time synchronization. It is important to know the start of the transmitted frame in order to guarantee exact alignment of the suppressing signal and zero interference to the information symbols. Synchronization in OFDM systems can be achieved by either transmitting a known training sequence (preamble) or by exploiting the redundancy of the CP. Preamble-based synchronization algorithms can be incorporated easily with the suppressing alignment approach, where the suppressing signal is not generated during the synchronization phase. However, this absence of the suppressing signal during the synchronization phase will not have any detrimental effects on the OOB interference or PAPR since the preamble is usually made up of pseudo-random (PN) sequences that have low OOB leakage and PAPR.

CP-based synchronization is based on the fact that the CP samples are similar to the corresponding data samples at the end of the OFDM symbol. These similar samples in the CP and the data portion of the OFDM symbol can be spaced by N samples apart. Using a sliding window correlator, this information can be used to detect the start of the OFDM symbol. However, after applying the suppressing signal to the OFDM signal, the CP samples are no longer a cyclic extension of the OFDM symbol. As such, the CP may no longer be utilized for synchronization purposes. To overcome this issue, the suppressing signal can be designed so that it leaves part of the CP and the corresponding samples in the data duration of the OFDM symbol unaffected. Accordingly, part of the CP samples can be used by the suppressing signal for OOB and PAPR reduction while the rest are used for synchronization. This partial CP usage is only during the synchronization phase, once synchronization is established the full CP length can be utilized by the suppressing signal.

Let R denote the number of CP samples used for synchronization located at the start of the OFDM symbol. As mentioned above, the R CP samples as well as the corresponding R data samples are not distorted in any way by the suppressing signal. As such, the transmitted signal during the synchronization period will be different than the one in EQN. (4b). The matrix W can be introduced to preserve the CP samples and their corresponding data samples as follows $$t_s = x + c_s = AF^H Md + WPs_s, \quad (35)$$

where $w \in \mathbb{R}^{(N+L) \times (N+L-2R)}$ and is constructed by selecting the N+L−2R columns of $I_{(N+L)}$ corresponding to the samples being protected from any distortion caused by the suppressing signal. Similar to EQN. (11), the alignment matrix P is designed such that span(P)=ker (BHW). The only difference now is that rank ((BHW))=N, and accordingly dim ker (BHW)=(N+L−2R)−rank ((BHW))=L−2R. Therefore, R<L/2 for ker (BHW) to exist. This practically means that the partial CP samples cannot be larger than half of the full CP length. Furthermore, compared to using the full L CP samples, the degrees of freedom utilized by the vector $s_s$ to suppress the spectrum and PAPR of the transmitted signal in EQN. (35) are reduced to L−2R during the synchronization phase. As such, this results in some degradation in the PAPR and OOB reduction performance. However, this performance loss is only during the synchronization phase and once synchronization has been established, performance will fall back to that of the full CP.

Numerical Results

In this section, simulation results are provided to show the effectiveness of the suppressing alignment approach in reducing the OOB interference. Consider an OFDM system 100 with N=64 subcarriers, where a single transmitter 103 is communicating with a receiver 106 over a Rayleigh multi-path channel 109 with L+1 taps and a uniform power delay profile. Additionally, assume that an adjacent user, using OFDM or any other technology, is transmitting over 10 subcarriers within the transmission band of the OFDM system 100. To evaluate the OOB reduction performance, $10^3$ 16-QAM symbols were randomly generated and Welch's averaged periodogram method was used to estimate the power spectrum. Also consider an upsampling factor of $\varsigma = 16$. Furthermore, in all simulations, define $\epsilon = \alpha \|x\|_2^2$, where $\alpha < 1$, i.e., the power of the vector s in EQN. (17) is a fraction of the conventional OFDM signal power.

Figure 2:
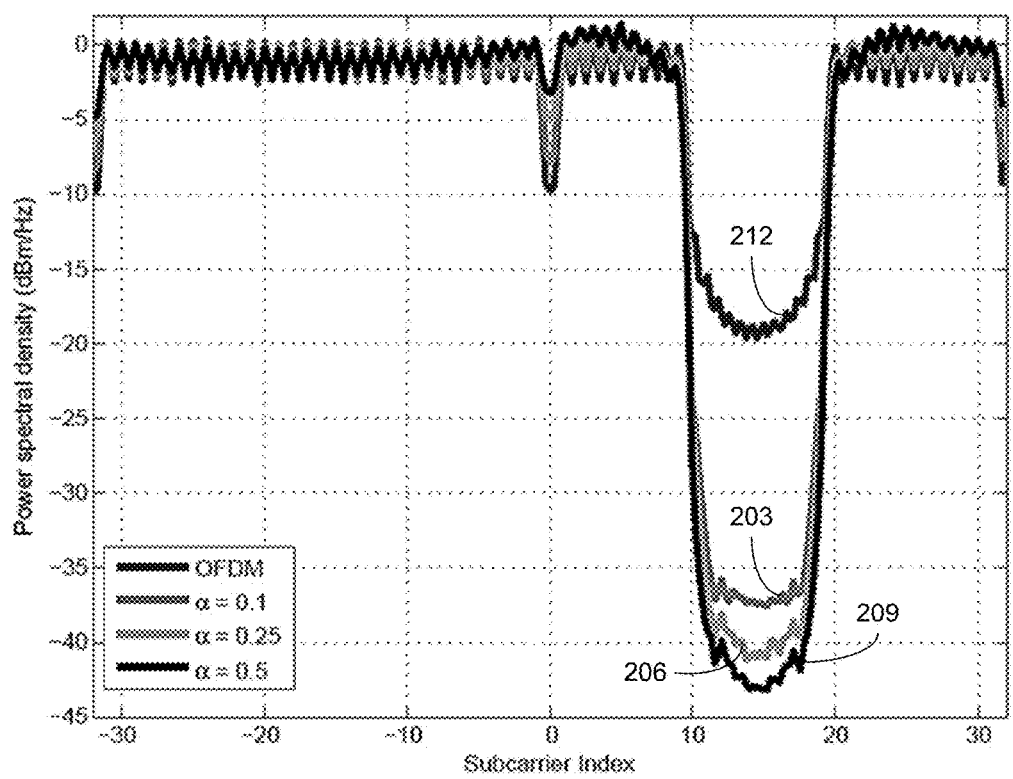
FIGS. 2-12 are examples of simulation results illustrating suppressing alignment with the OFDM system of FIGS. 1A and 1B in accordance with various embodiments of the present disclosure.

Referring to FIG. 2, shown are plots of power spectral density for 4-QAM symbols with a CP length of L=16. The OOB reduction performance as a function of α is shown for α=0.1, 0.25 and 0.5 (curves 203, 206 and 209, respectively). A remarkable reduction in the OOB interference is obtained by the suppressing alignment method compared to plain OFDM (curve 212). As illustrated in FIG. 2, the amount of reduction increases with the power of the suppressing signal. More specifically, an increment as small as 10% (i.e., curve 203 α=0.1) in the power of the transmitted signal results in more than an 18 dB reduction in the OOB interference, while a 25% power increase (curve 206) reduces the interference by more than 22 dB. However, a slight overshoot in the power spectrum close to the band edges was observed at higher values of a as in the case of α=0.5 (curve 209). This may be attributed in part to the high impact of edge subcarriers on the spectral sidelobes.

Figure 3:
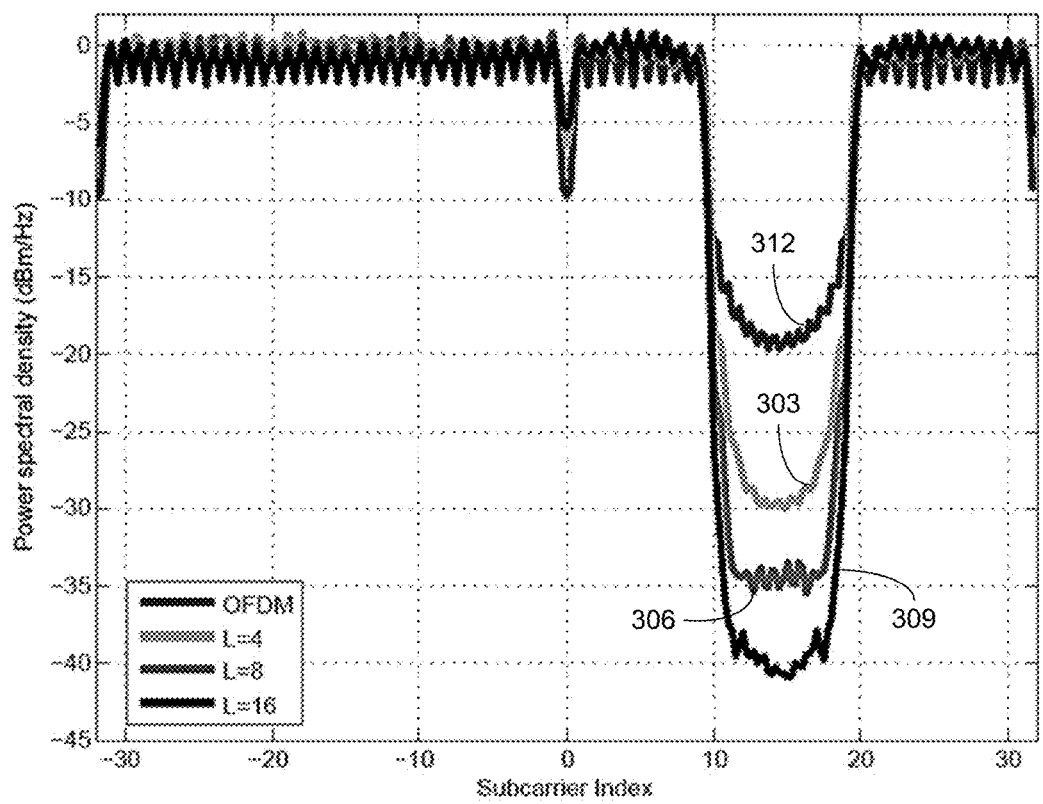

Referring next to FIG. 3, shown are plots of power spectral density for 4-QAM symbols with the power of the suppressing signal α=0.25. The effect of the CP length L (which also corresponds to the order of the channel 109) on the performance is evaluated for L=4, 8 and 16 (curves 303, 306 and 309, respectively). Here, the power of the suppressing signal is limited to no more than 25% of that of the conventional OFDM signal (curve 312). The size of the CP has a notable impact on the interference reduction. In particular, a larger CP size brings about more performance improvement in OOB interference. This may be attributed to the greater degrees of freedom and extra dimensions offered by systems with larger CP sizes, which are fully exploited by the suppressing signal.

Figure 4:
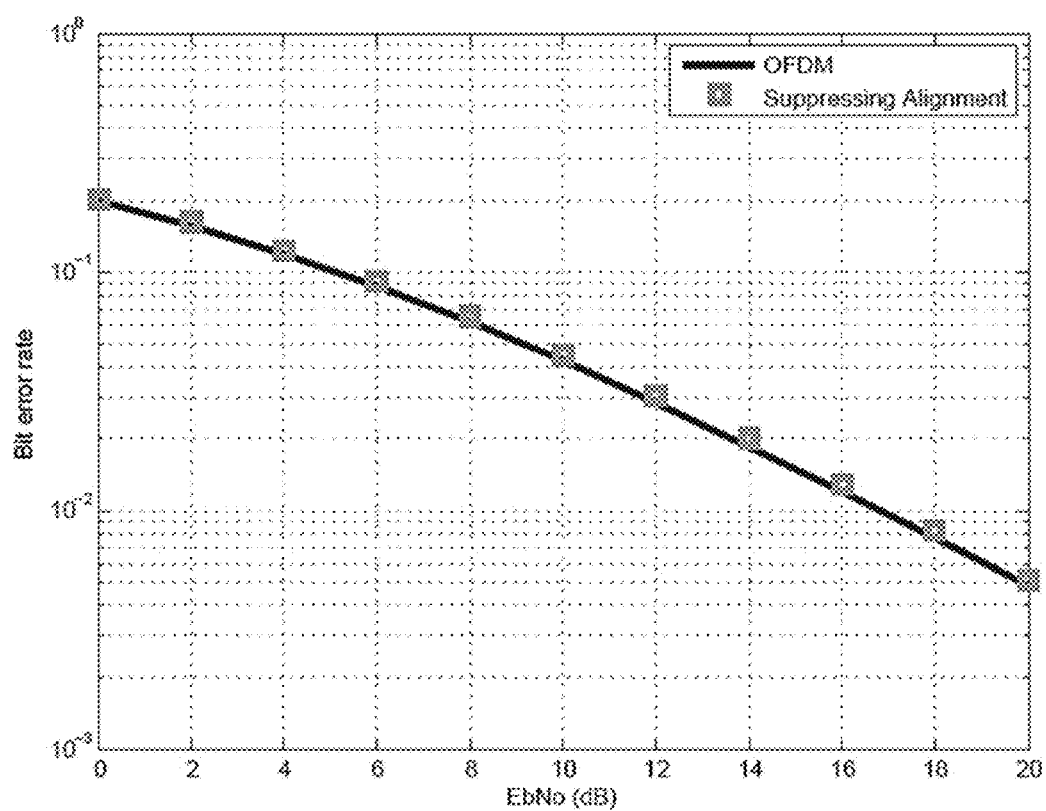

Finally, in order to validate that the added suppressing signal in EQN. (4) does not cause any interference to the accompanying OFDM symbol, the BER performance for 16-QAM was evaluated of the suppressing alignment approach in FIG. 4. Herein, assume perfect CSI at the transmitter 103 (FIG. 1), i.e., the receiver 106 (FIG. 1) estimates the channel 109 and feeds its correct estimate back to the transmitter 103. Under the condition of perfect CSI, the error performance of the proposed approach is identical to legacy OFDM transmission. In realistic scenarios, the transmitter has access to only noisy channel estimations (imperfect CSI), which might affect the error performance. Nevertheless, imperfect CSI does not affect the OOB interference performance of the suppressing alignment approach.

In the following description, the OOB reduction as well as the PAPR performance of the suppressing alignment method is evaluated with computer simulations. For simulation tractability, consider an OFDM system 100 with N=64 subcarriers and a CP length of L=16 samples. Additionally, assume that the OFDM transmitter detects an adjacent user spanning 10 subcarriers within its band of transmission. Thus, these subcarriers are disabled by the OFDM system 100, while the remaining subcarriers are utilized for transmission. The transmission is carried through a multipath Rayleigh fading channel 109 with L+1 taps and a uniform power delay profile (PDP). To illustrate the OOB power leakage reduction performance of the suppressing alignment method, $10^4$ 4-QAM symbols were generated randomly and Welch's averaged periodogram method was used to estimate the power spectrum. The PAPR reduction performance was evaluated using the complimentary cumulative distribution function (CCDF). Furthermore, in all simulations, constrain the power of the suppressing signal to be a fraction of the power of the plain OFDM signal, i.e., $\epsilon = \alpha \|x\|_2^2$, where $\alpha$ is a parameter that controls the power allocated to the suppressing signal. The maximum power percentage consumed by the suppressing signal is $\alpha/1+\alpha$ of the total available power budget. In all simulations, the total power budget is assumed to be shared between the OFDM signal and the suppressing signal.

PAPR and OOB Power Leakage Reduction Performance

Figure 5A:
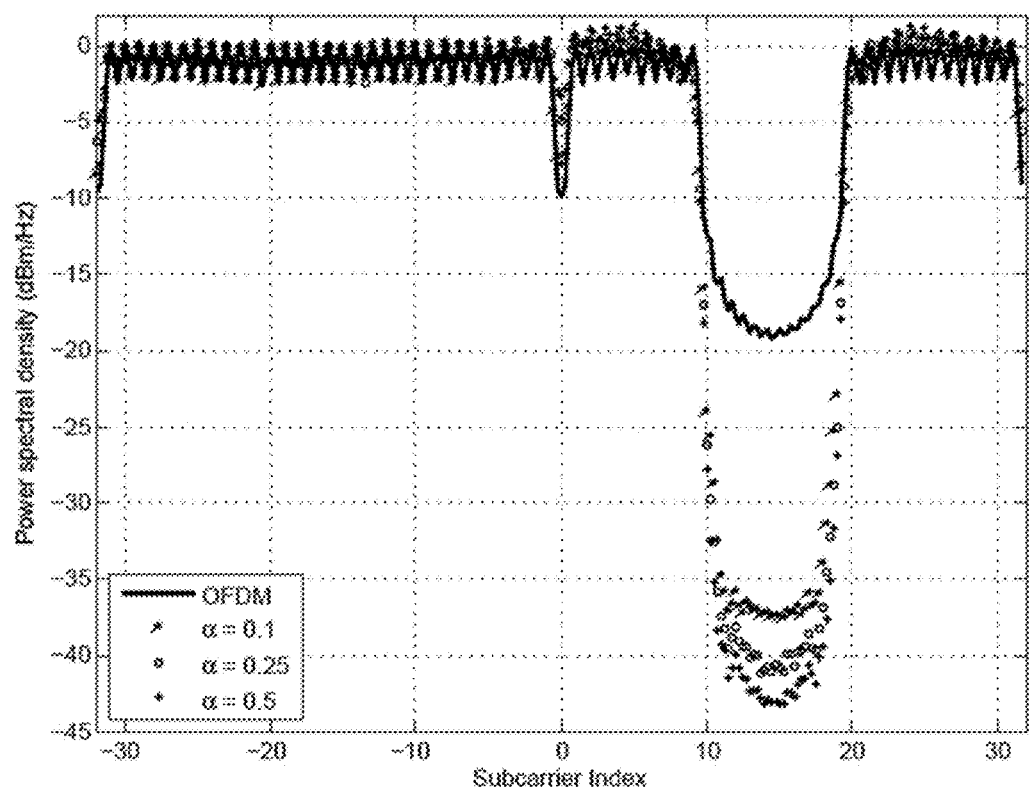
Figure 5B:
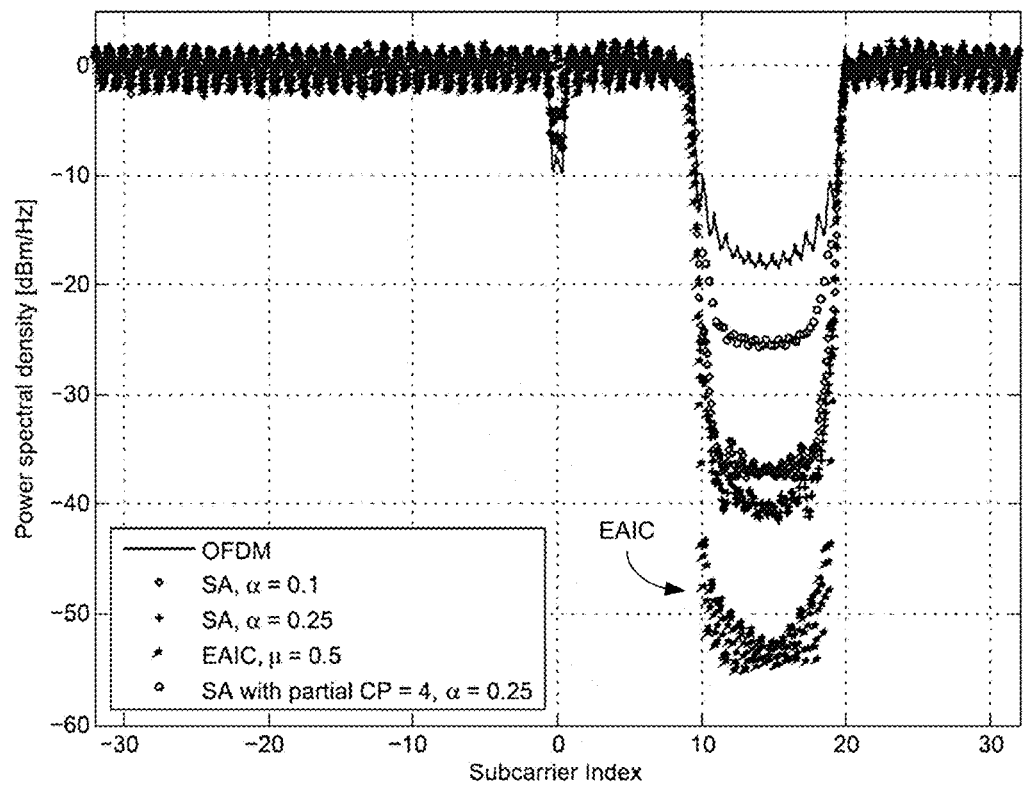

First, the OOB power leakage reduction of the suppressing alignment method was evaluated based on EQN. (17), without considering the PAPR reduction (i.e., $\lambda=0$). Referring to FIGS. 5A and 5B, shown are plots of power spectral density for 4-QAM symbols. As shown in FIGS. 5A and 5B, the suppressing alignment (SA) method achieves remarkable levels of OOB power leakage reduction compared to plain OFDM. Note that the amount of OOB power leakage reduction increases as a increases, i.e., as more power is allocated to the suppressing signal. For example, in FIG. 5A a 10% power increase in the transmitted signal power ($\alpha=0.1$) reduces the OOB leakage by roughly 18 dB, while approximately 22 dB reduction is obtained for a 25% power increase. By examining FIG. 5A, a slight overshoot in the spectrum close to the band edges can be observed, especially as $\alpha$ grows. This may be attributed to the fact that the suppressing signal puts more power on the subcarriers close to the edges because of their high contribution to the OOB power leakage.

In the example of FIG. 5B, for $\alpha=0.1$ or approximately %9 of the total power budget, the suppressing signal reduces the OOB leakage by roughly 18 dB, while approximately 22 dB reduction is obtained when $\alpha=0.25$ or %20 of the total power budget. Note that the performance depends on the number of CP samples used by the suppressing signal as demonstrated by the case of partial CP usage in FIG. 5B, where an approximately 7 dB reduction compared to the plain OFDM was achieved using only 4 CP samples. In can be seen that partial CP was used only during the synchronization phase. FIG. 5B also shows the performance of the extended active interference cancellation (EAIC) scheme evaluated under the same spectral efficiency as the suppressing alignment approach. Although the EAIC scheme achieves better OOB reduction compared to the suppressing alignment method, it does so by introducing distortion on the data subcarriers which leads to degradation in the BER performance.

Figure 6:
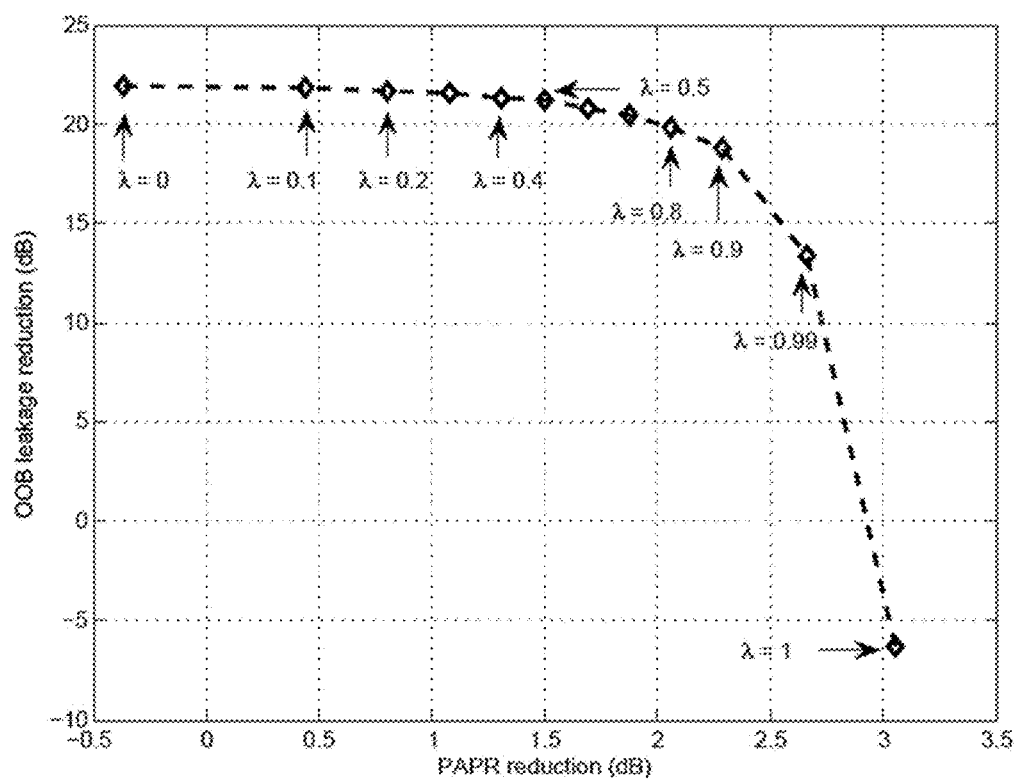

Referring next to FIG. 6, shown is an example of the trade-off between the PAPR reduction and OOB reduction performance for the joint optimization problem in EQN. (22). The trade-off is visualized by showing the average reduction in both OOB leakage and PAPR as a function of the adaptation parameter $\lambda$ when $\alpha$ is set to 0:25. Note that when $\lambda=0$, the optimization problem of EQN. (22) is equivalent to EQN. (17), where only the OOB interference is minimized. The average reduction in OOB interference in this case is approximately 22 dB, which agrees with the results in FIGS. 5A and 5B when $\alpha=0:25$. Increasing $\lambda$ beyond zero, reduces the gain in terms of OOB leakage reduction while gradually improving the PAPR reduction performance. As shown in FIG. 6, a maximum average PAPR reduction of more than 3 dB is obtained when $\lambda=1$. However, in this case, and as expected, there is no gain in the OOB interference reduction. In fact, the OOB power leakage increases due to the fact that the suppressing signal places some power in the adjacent band. The same is true when $\lambda=0$, where a pure OOB leakage reduction leads to a slight increase in the PAPR as shown in FIG. 6.

Figure 7A:
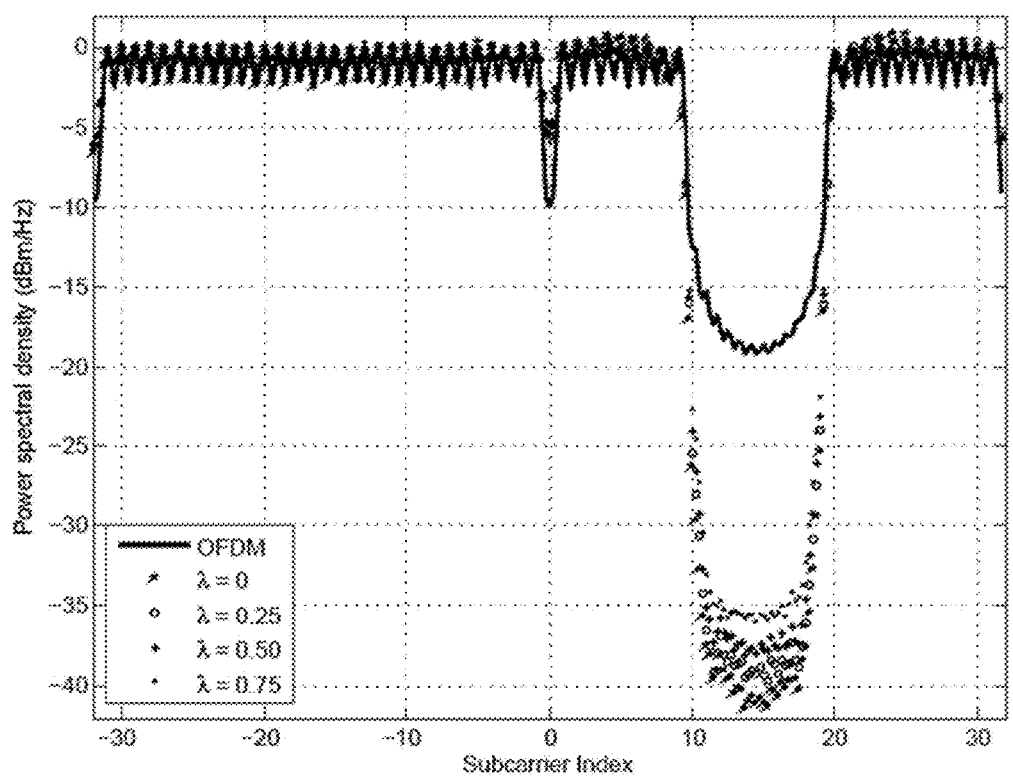
Figure 7B:
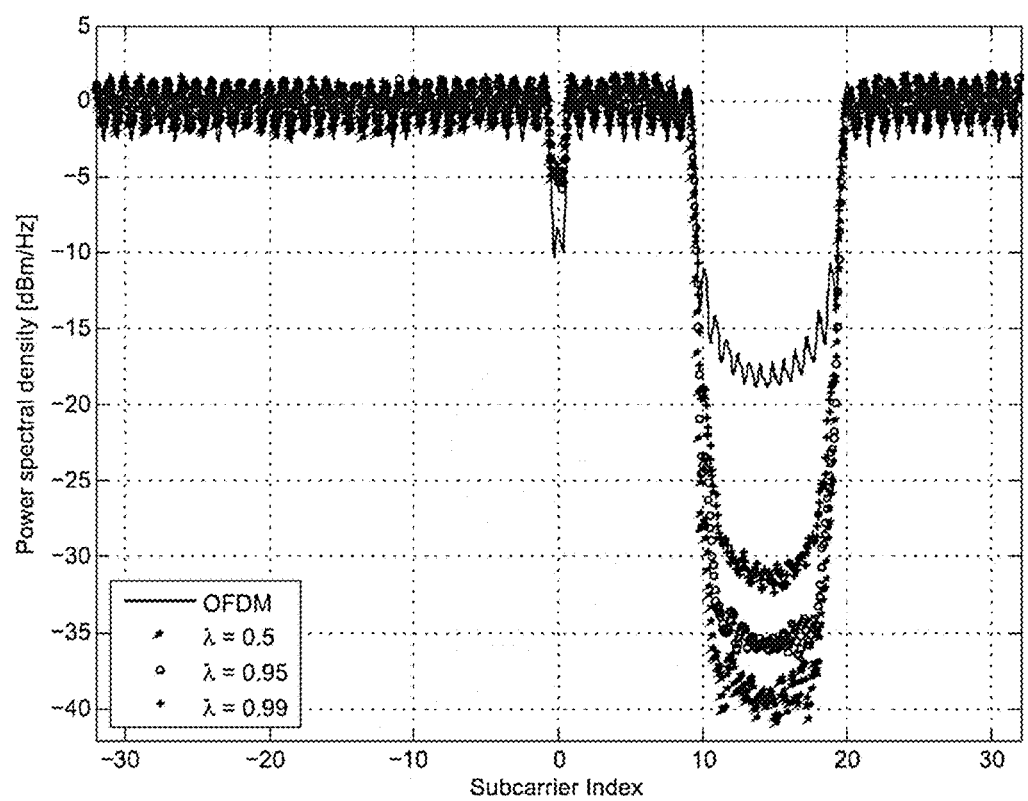
Figure 8:
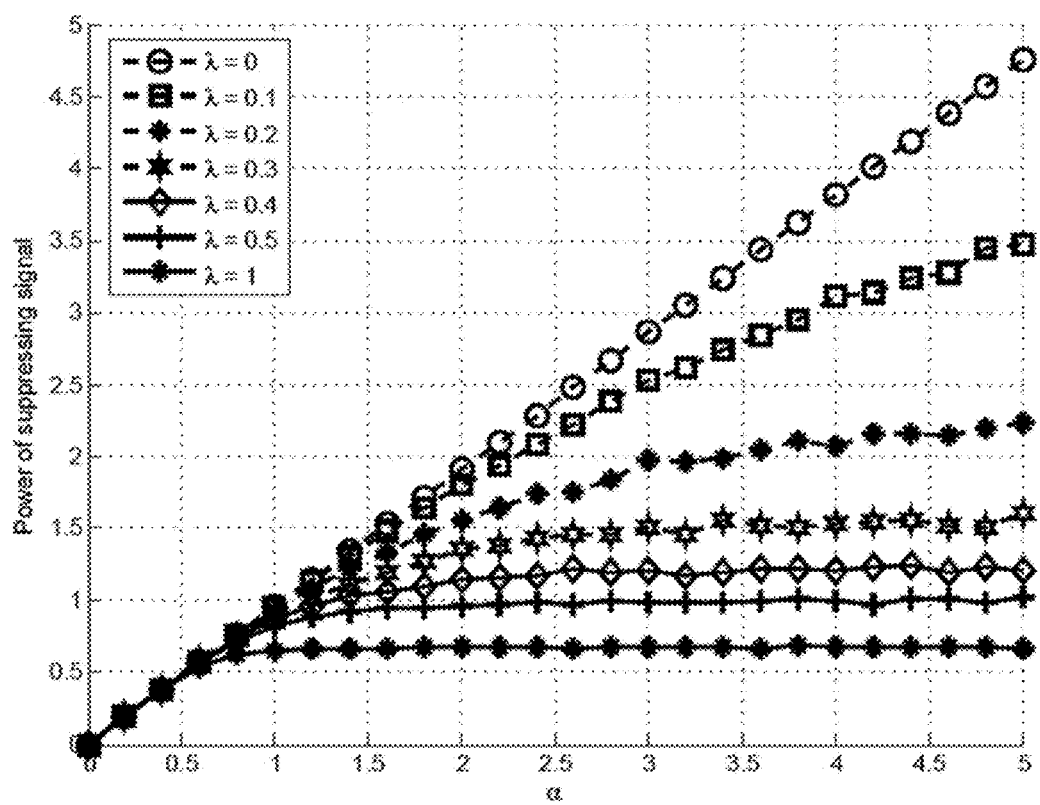

The OOB power leakage reduction for different values of $\lambda$ is shown in FIGS. 7A and 7B. Here, the power of the suppressing signal is fixed at 25% of the original OFDM signal, i.e., $\alpha=0.25$. These results in FIGS. 7A and 7B expand over the mean OOB reduction results in FIG. 6 by showing the actual power spectral density of the transmitted signal. As seen from FIGS. 7A and 7B, the OOB leakage is significantly reduced as $\lambda$ decreases, which is rather expected as more emphasis is put on the OOB leakage reduction relative to the PAPR reduction. In order to understand the behavior of the joint optimization problem in EQN. (22) with regard to the actual power allocated to the suppressing signal, the average power of the suppressing signal is plotted against a for different values of the adaptation parameter $\lambda$, as shown in FIG. 8. The results in FIG. 8 indicate that when the PAPR is not considered, i.e., $\lambda=0$, the actual power used by the suppressing signal changes linearly with $\alpha$. In other words, all power allocated to the suppressing signal will be completely utilized to reduce the spectral sidelobes. However, as the PAPR reduction is slowly factored into the problem, the utilization of the allocated power decreases. Specifically, observe that as the adaptation parameter $\lambda$ increases gradually, the suppressing signal uses less power to jointly reduce both PAPR and spectral leakage. For the extreme case of $\lambda=1$, i.e., when it is a pure PAPR reduction problem, the power of the suppressing signal completely saturates regardless of how much power is allocated through the parameter $\alpha$.

Figure 9A:
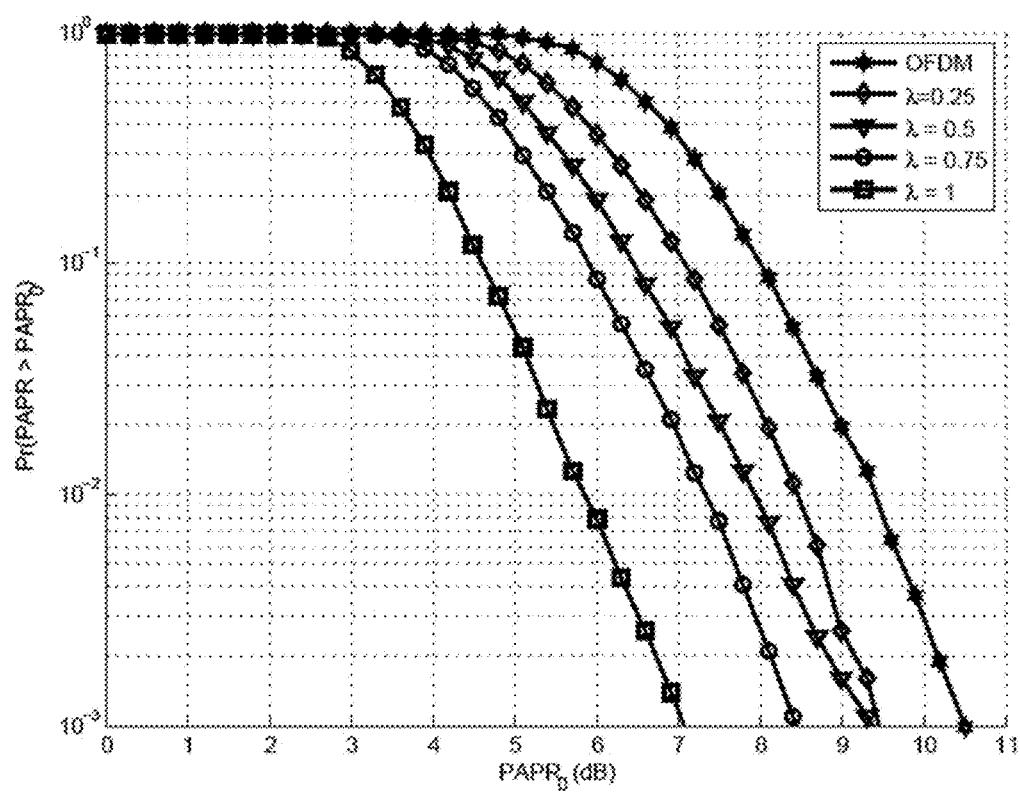
Figure 9B:
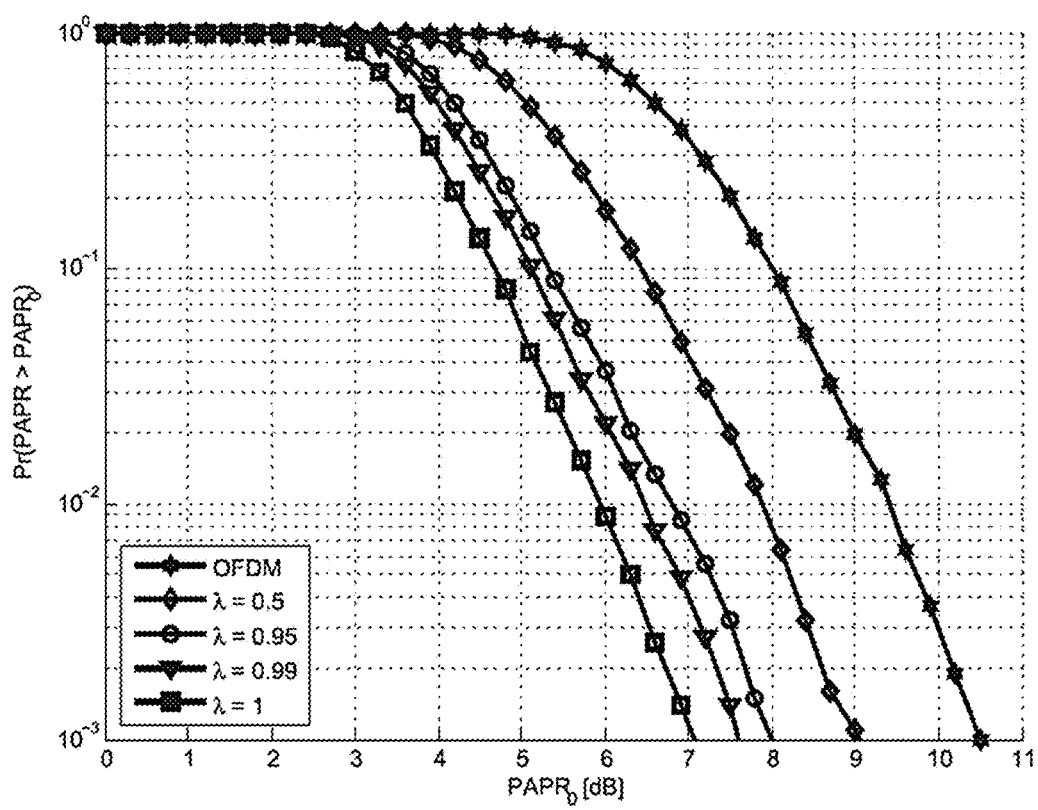
Figure 9C:
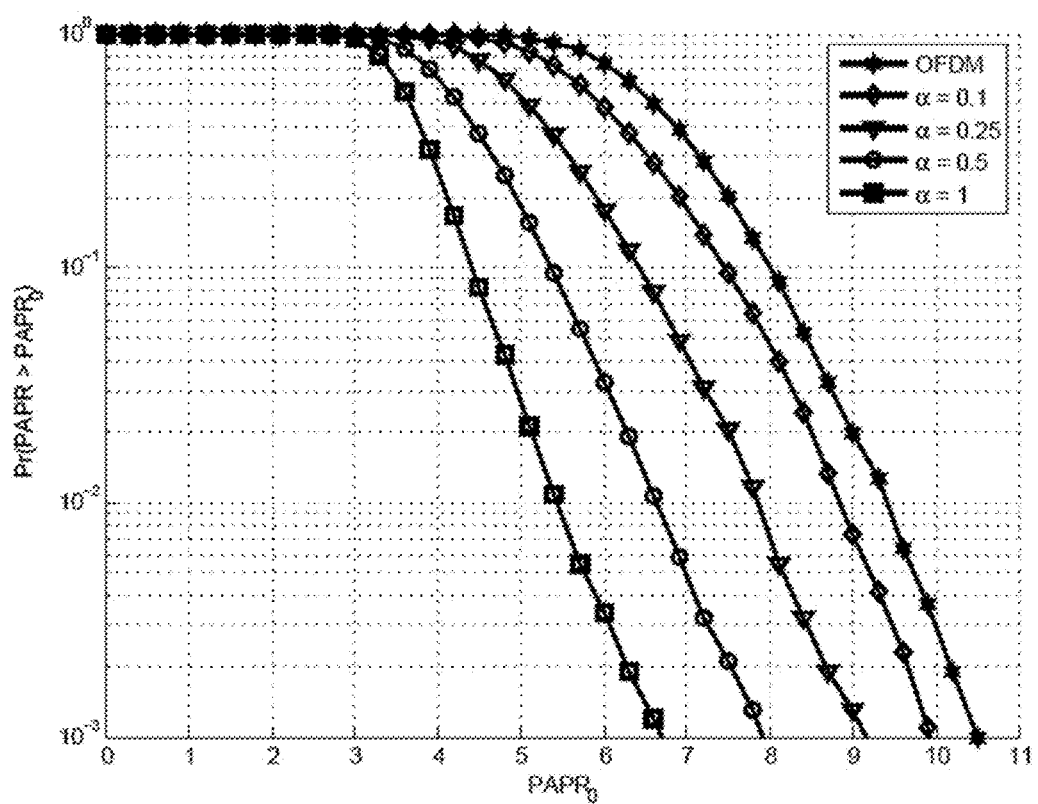

The performance of the suppressing alignment method is now characterized with regard to PAPR reduction. In order to do that, consider the actual instantaneous power distribution of the transmitted signal and plot its CCDF as shown in FIGS. 9A, 9B and 9C. In FIGS. 9A and 9B, the PAPR performance for different values of $\lambda$ and a fixed $\alpha=0.25$. Note that a remarkable reduction in the PAPR was obtained as shown in FIGS. 9A and 9B. In particular, this reduction increases as the adaptation parameter $\lambda$ grows, i.e., the PAPR reduction is emphasized compared to the power leakage reduction. For example, in the extreme case of $\lambda=1$, the PAPR of the transmitted signal is around 7 dB at a probability of $10^{-3}$; a reduction of approximately 3.5 dB from that of the plain OFDM signal. However, there is no reduction in the OOB interference when $\lambda=1$. Nonetheless, decent improvements in the PAPR performance can still be obtained even for small values of $\lambda$ while simultaneously allowing large reductions in the OOB interference. For example, when $\lambda$ is set to 0.25, the PAPR of the transmitted signal is around 9.5 dB compared to 10.5 dB for plain OFDM, and when $\lambda$ is set to 0.5, the PAPR of the transmitted signal is around 9 dB compared to 10.5 dB for the plain OFDM. At the same value of λ, the OOB power of the transmitted signal is around −39 dB compared to −19 dB or −18 dB for plain OFDM; a 20 dB or 21 dB reduction as shown in FIG. 7A or 7B. The variation of the PAPR performance with the power of suppressing signal is shown in FIG. 9C. In the extreme case of having a suppressing signal with the same power as the OFDM signal (consuming 50% of the total power budget), i.e., when α=1, the PAPR is reduced by approximately 4 dB at a probability of $10^{-3}$. Alternatively, for α=0.25, the PAPR is reduced by approximately 1.5 dB, showing that a slight increase in the power of the transmitted signal can still lead to good reduction in the PAPR.

Bit Error Performance

Figure 10A:
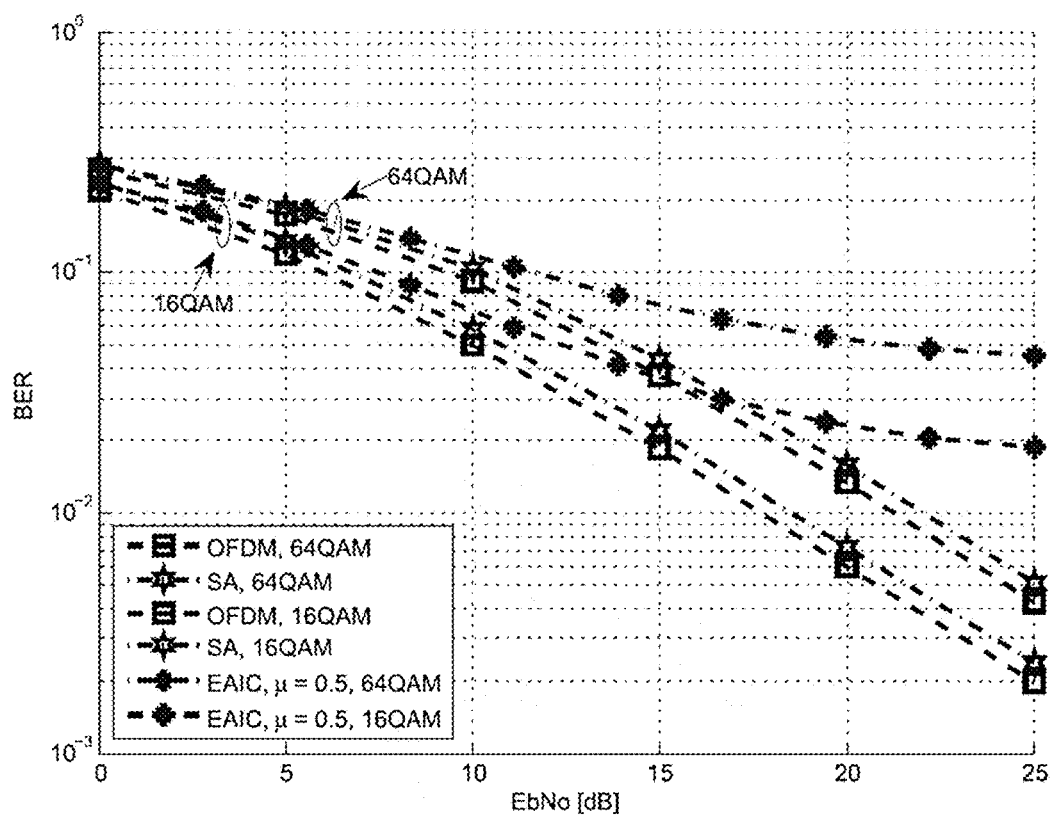

Referring to FIG. 10A, an example of the BER performance of the suppressing alignment method as well as the EAIC scheme for 16-QAM and 64-QAM is shown with λ=0.5 and α=0.25. The performance was evaluated in a Rayleigh multipath fading channel. The EAIC clearly has an error floor due the distortion it introduces to the data subcarriers. On the contrary, the suppressing alignment scheme offers a distortion-free transmission without any changes to the receiver structure. It is worth noting that the small offset in performance between the suppressing alignment scheme and plain OFDM may be attributed to the fact that the total power budget is shared between the suppressing signal and the OFDM signal.

Figure 10B:
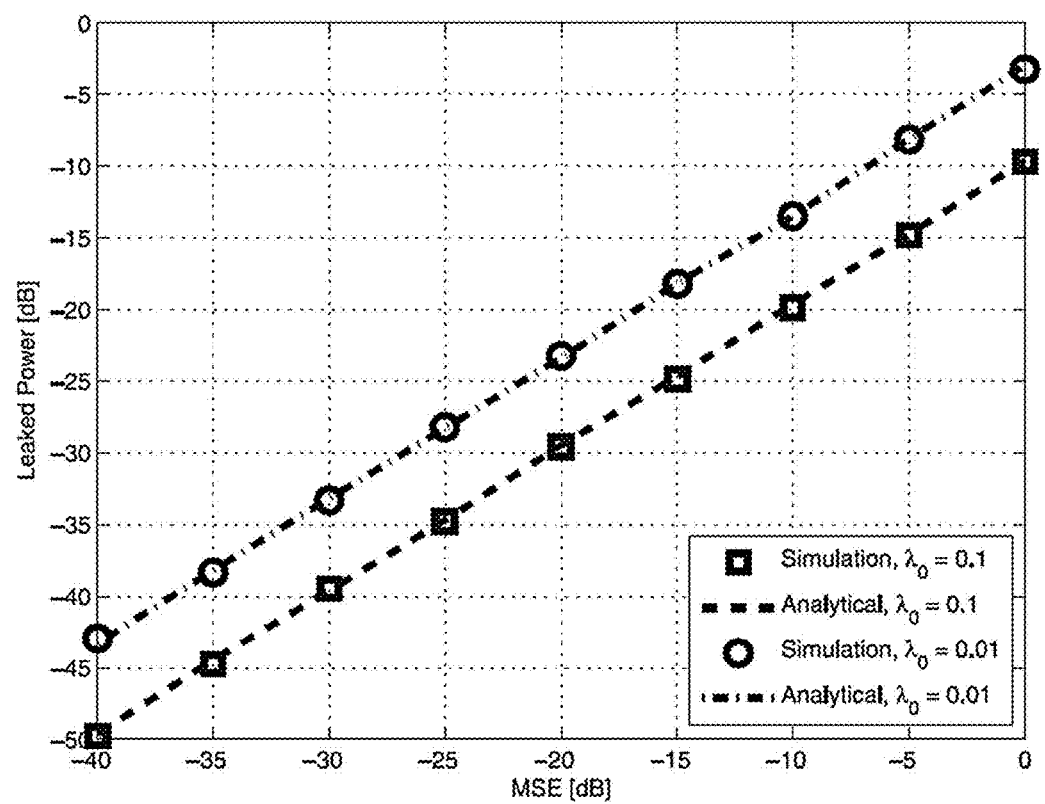
Figure 11:
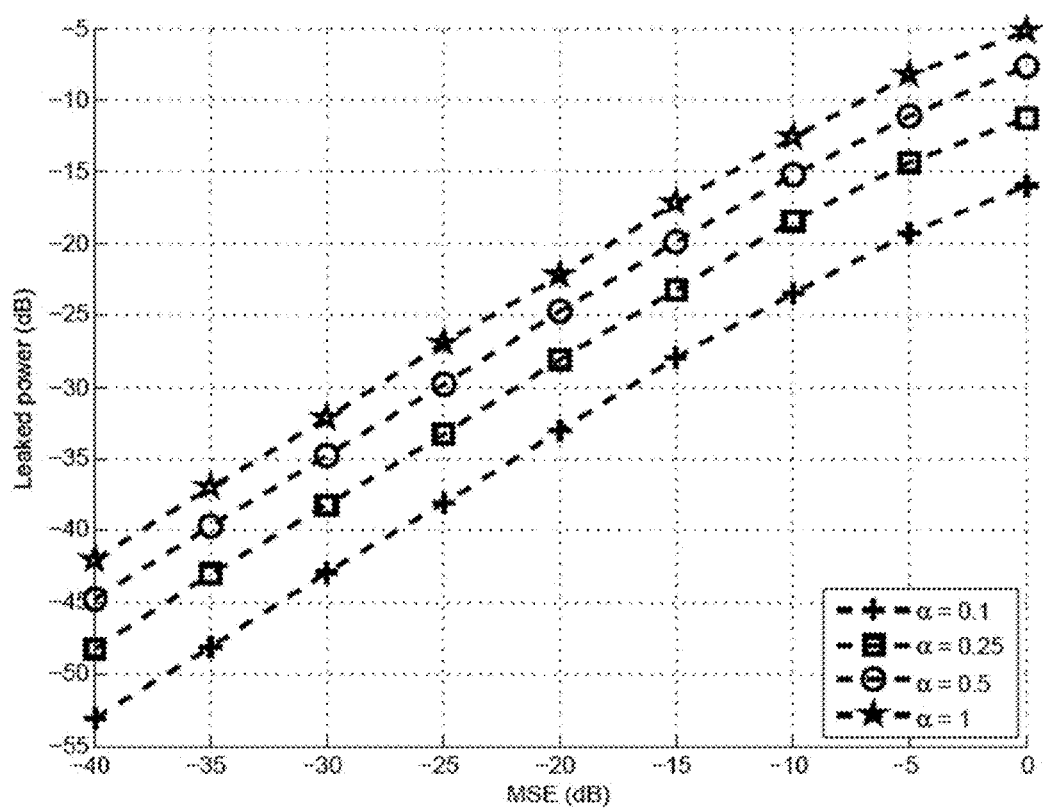

The BER results in FIG. 10A were obtained with the assumption that there is no channel estimation errors. However, and as mentioned before, if the correct channel is not perfectly known at the transmitter 103 (FIGS. 1A and 1B), the suppressing signal will leak into the OFDM signal. FIG. 10B shows the analytical leaked power expression in EQN. (33) as well as the simulated leaked power plotted against the MSE of different channel errors when only the OOB interference reduction is considered, i.e., λ=0. It is clear that the leaked power values obtained from the closed-form expression in EQN. (33) match those obtained from the simulation. The leaked power when the OOB and PAPR reduction is jointly considered is shown in FIG. 11, where the results are obtained through simulation since there is no closed-form expression for the leaked power in this case.

Imperfect Channel State Information

In a practical environment, the assumption of perfect channel knowledge might not be valid. Therefore, in this subsection the performance of the suppressing alignment algorithm is evaluated when the transmitter has imperfect CSI. The channel 109 is estimated at the receiver 106 (FIG. 1) and the CSI is fed back to the transmitter 103 (FIG. 1). The transmitter 103 then uses this CSI to generate the suppressing signal c=Ps. To evaluate the impact of channel estimation errors, assume that the channel 109 used at the transmitter 103 is different than the real channel 109 that the signal is transmitted through. The error in channel estimation is quantified by the mean square error (MSE) defined as:

$$\text{MSE} = \mathbb{E}\left[1/N \sum_{k=1}^{N} |\hat{H}(k) - H(k)|^2\right], \quad (36)$$

where k is the subcarrier index and $\hat{H}(k)$ is the erroneous channel given by:

$$\hat{H}(k) = H(k) + e(k), \quad (37)$$

where the estimation error e(k) is modeled as a complex Gaussian random variable with zero mean and variance $\sigma_e^2$ equal to the MSE in EQN. (36). This simple model has previously been used to roughly evaluate the impact of imperfect CSI.

The received signal after CP removal and DFT operation is given by EQN. (9), where the precoding matrix P is designed based on knowledge of the channel 109 at the transmitter 103. If the channel 109 communicated back to the transmitter 103 by the receiver 106 is erroneous, then P is designed based on $\hat{H}$ as opposed to the true channel H. Therefore, the second term in EQN. (9) would not vanish, i.e., EQN. (10) is not true anymore. This effectively means that the suppressing signal leaks into the data part of the OFDM symbol instead of precisely being aligned with the CP duration. Nevertheless, the erroneous channel information does not effect the OOB power leakage and PAPR reduction performance of the proposed method, since the suppressing signal is still designed based on EQN. (17) or EQN. (22).

Figure 12:
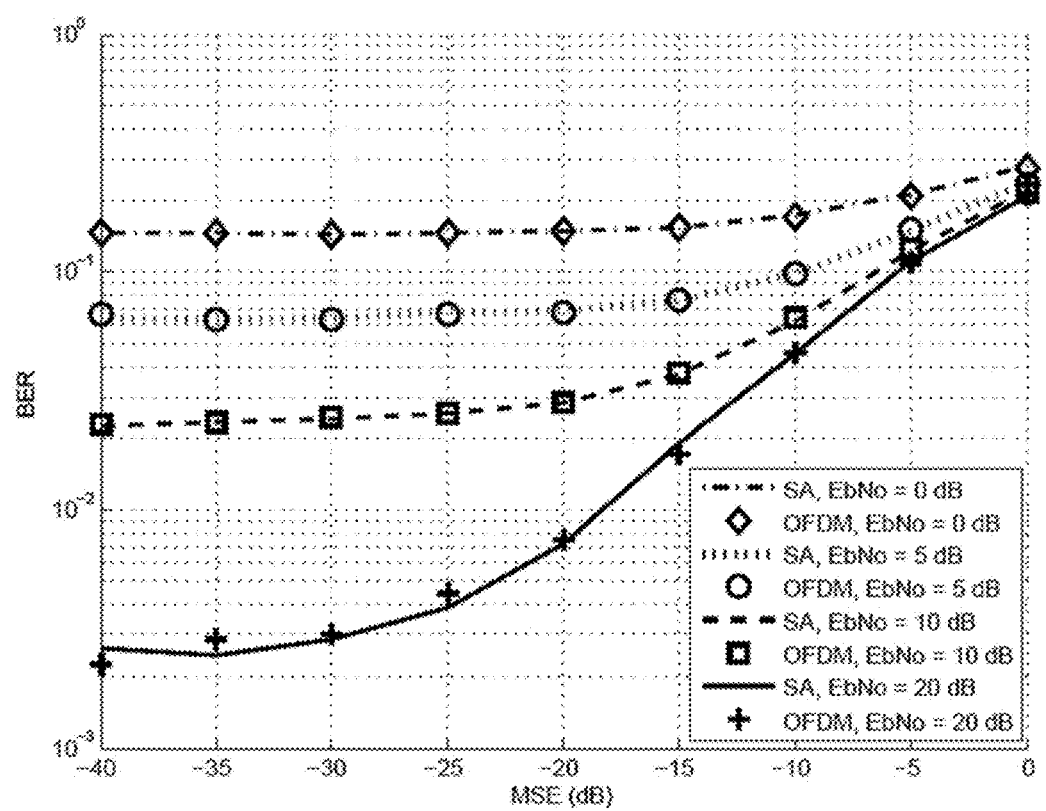

Using the simplified model above, Monte Carlo simulations were conducted to assess the impact of this leakage on the BER performance of the suppressing alignment algorithm for different values of signal-to-noise ratio (SNR) as shown in FIG. 12. The simulations were bench-marked against the error performance of plain OFDM under the same noisy channel estimation. As observed in FIG. 12, the error performance of the suppressing alignment algorithm was identical to that of standard OFDM under channel estimation errors. This may be explained by looking at FIG. 11. There, the average power leakage of the suppressing signal into the data part of the received OFDM symbol, defined as:

$$Q = \mathbb{E}_f[\|BHPs\|_2^2], \quad (25)$$

is plotted against the MSE of the channel 109 for different values of α with Δ=0.5. In FIG. 11, the leaked power is at least 8 dB less than the channel MSE when α=0.25. Essentially, the noisy channel dominates the error performance. As such, no degradation in the BER is observed as shown in FIG. 11 when α=0.25.

CONCLUSION

In this disclosure, a suppressing alignment approach was presented for reducing the OOB interference in OFDM systems by exploiting the degrees of freedom provided by the CP and the wireless channel 109. Suppressing alignment maintains a similar error performance as legacy OFDM transmissions without inducing any change in the receiver structure. The effectiveness of the suppressing alignment method in obtaining large reductions in the OOB leakage was shown through numerical simulations. Furthermore, the suppressing alignment approach can generate transmitted signals that are secure, a rare free advantage that comes along with the OOB reduction.

The suppressing alignment approach can also generate a suppressing signal to jointly reduce the OOB power leakage and PAPR of OFDM-based systems. An advantage of the suppressing alignment approach is that it does not reduce the spectral efficiency as it exploits the inherent redundancy in OFDM provided by the CP. The suppressing signal can also be constructed in such a way that it does not create any interference to the information data carried in the OFDM symbol. In particular, by utilizing the wireless channel 109, the suppressing signal can be aligned with the CP duration at the receiver 106 (FIG. 1), effectively creating an interference-free transmission with a BER performance similar to legacy OFDM without requiring any change in the receiver structure. The effectiveness of the suppressing alignment approach in obtaining reduction in both the OOB power leakage and PAPR was shown with computer simulations. The performance trade-off between the OOB power leakage reduction and PAPR reduction was shown where both can flexibly be controlled though an adaptation parameter. Furthermore, the impact of imperfect CSI on the error performance of the suppressing alignment approach was investigated. The simulation results showed no degradation in the BER performance of the suppressing alignment approach compared to legacy OFDM under the same noisy channel errors.

Figure 13A:
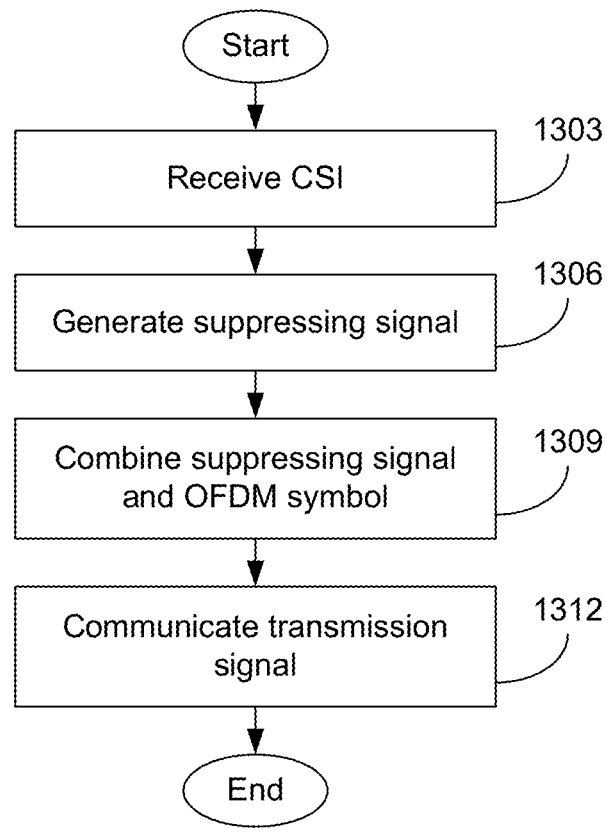
FIGS. 13A and 13B are flow charts illustrating examples of suppressing alignment operations with the OFDM system of FIGS. 1A and 1B in accordance with various embodiments of the present disclosure.

Referring next to FIG. 13A, shown is a flow chart illustrating an example of suppression alignment of OFDM symbols. Beginning with 1303, CSI for the communication channel is received from a receiving device. A suppressing signal is generated for an OFDM symbol at 1306. The OFDM symbols can include a cyclic prefix and a data portion. The suppressing signal is based at least in part upon the CSI for the communication channel and has a length that is equal to the OFDM symbol. In 1309, the suppressing signal and OFDM symbol are combined to form a transmission signal such that their lengths are aligned with each other. The transmission signal can then be communicated to the receiving device via the communication channel at 1312. Communication of the transmission signal through the wireless communication channel reduces and substantially aligns the length of the suppressing signal with a length of the CP at the receiving device. The process may be repeated for each of a series of OFDM symbols.

Figure 13B:
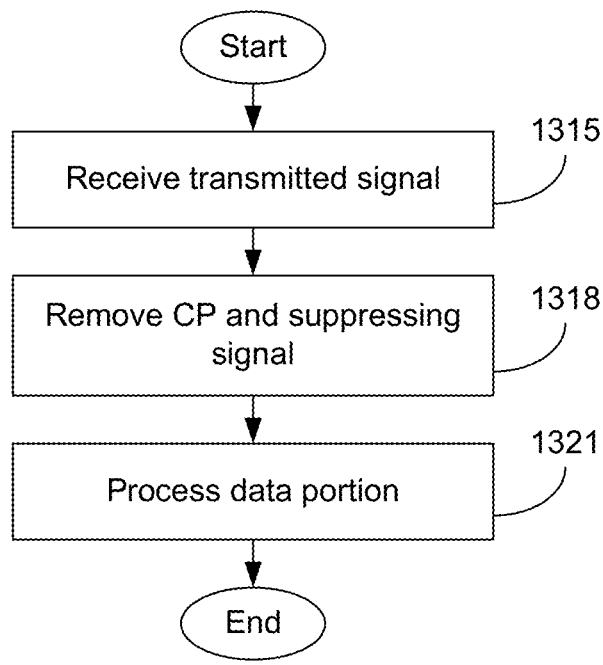

Referring next to FIG. 13B, shown is a flow chart illustrating an example of receiving the suppressed OFDM symbols. Beginning with 1315, the transmitted signal is received by the receiving device via the communication channel. With the suppressing signal substantially aligned with the CP of the OFDM symbol, the CP and suppressing signal can be removed using a CP removal matrix at 1318. The remaining data portion can then be processed in 1321.

Figure 14:
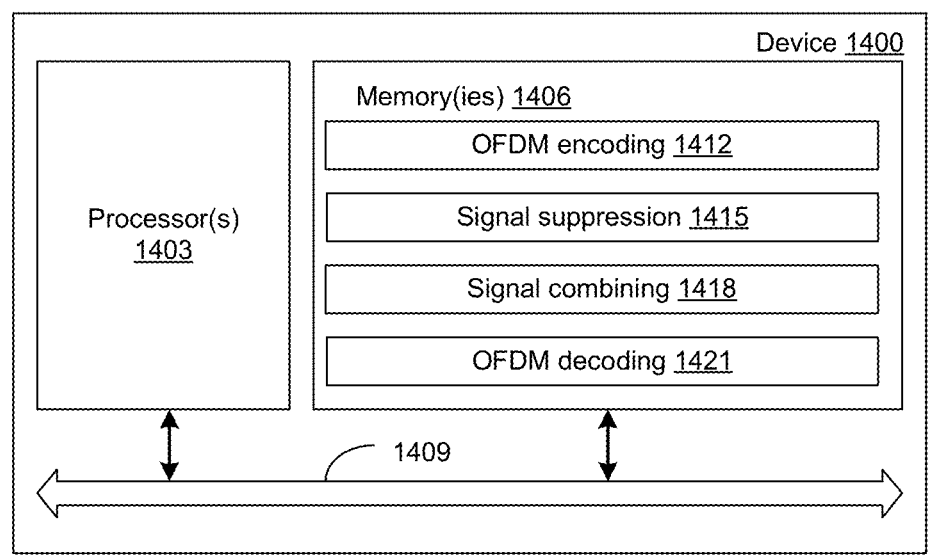
FIG. 14 is a schematic block diagram of an example of a transmitting and/or receiving device for wireless communications in accordance with various embodiments of the present disclosure.

With reference to FIG. 14, shown is a schematic block diagram of an example of a transmitting and/or receiving device 1400 (e.g., transmitter 103 and/or receiver 106 of FIG. 1) for wireless communications in accordance with various embodiments of the present disclosure. The device 1400 includes at least one processor circuit, for example, having a processor 1403 and a memory 1406, both of which are coupled to a local interface 1409. The device 1400 may include one or more interface(s) that comprise processing circuitry for supporting Wi-Fi communications such as, e.g., IEEE 802.11a/b/g/n or other wireless communication protocols, and/or cellular communications such as, e.g., LTE, WiMAX, or other wireless communication protocols that utilize OFDM. In various embodiments, the processing circuitry is implemented as at least a portion of a microprocessor. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. The processing circuitry may further include memory configured to store instructions and/or code that causes the processing circuitry to execute data communication functions. The local interface 1409 may comprise, for example, a data bus with an accompanying address/control bus or other bus structure as can be appreciated.

Stored in the memory 1406 may be both data and several components that are executable by the processor 1403. In particular, stored in the memory 1406 and executable by the processor 1403 may be OFDM encoding 1412, signal suppression 1415, signal combining 1418, OFDM decoding 1421, and/or potentially other applications and device interfaces. In addition, an operating system may be stored in the memory 1406 and executable by the processor 1403. In some cases, the processor 1403 and memory 1406 may be integrated as a system-on-a-chip. In other embodiments, the OFDM encoding 1412, signal suppression 1415, signal combining 1418, and/or OFDM decoding 1421 may be implemented in firmware and/or dedicated hardware or circuitry.

It is understood that there may be other applications that are stored in the memory 1406 and are executable by the processor 1403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 1406 and are executable by the processor 1403. In this respect, the term "executable" means a program file that is in a form that can ultimately be run by the processor 1403. Examples of executable programs may be, for example, a compiled program that can be translated into machine code in a format that can be loaded into a random access portion of the memory 1406 and run by the processor 1403, source code that may be expressed in proper format such as object code that is capable of being loaded into a random access portion of the memory 1406 and executed by the processor 1403, or source code that may be interpreted by another executable program to generate instructions in a random access portion of the memory 1406 to be executed by the processor 1403, etc. An executable program may be stored in any portion or component of the memory 1406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1406 is defined herein as including both volatile and nonvolatile memory and data storage components. Volatile components are those that do not retain data values upon loss of power. Nonvolatile components are those that retain data upon a loss of power. Thus, the memory 1406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1403 may represent multiple processors 1403 and the memory 1406 may represent multiple memories 1406 that operate in parallel processing circuits, respectively. In such a case, the local interface 1409 may be an appropriate network that facilitates communication between any two of the multiple processors 1403, between any processor 1403 and any of the memories 1406, or between any two of the memories 1406, etc. The local interface 1409 may comprise additional systems designed to coordinate this communication, including, for example, performing load balancing. The processor 1403 may be of electrical or of some other available construction.

Although OFDM encoding 1412, signal suppression 1415, signal combining 1418, OFDM decoding 1421, and/or other various systems described herein may be embodied in software or code executed by general purpose hardware, as an alternative the same may also be embodied in dedicated hardware, firmware, or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 13A and 13B show the functionality and operation of an implementation of portions of the OFDM encoding 1412, signal suppression 1415, signal combining 1418, OFDM decoding 1421 or corresponding circuitry. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1403 in a computer system or other system. The machine code may be converted from the source code, etc. If embodied in hardware, each block may represent a circuit or a number of interconnected circuits to implement the specified logical function(s).

Although the flowcharts of FIGS. 13A and 13B show a specific order of execution, it is understood that the order of execution may differ from that which is depicted. For example, the order of execution of two or more blocks may be scrambled relative to the order shown. Also, two or more blocks shown in succession in FIGS. 13A and 13B may be executed concurrently or with partial concurrence. Further, in some embodiments, one or more of the blocks shown in FIGS. 13A and 13B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including OFDM encoding 1412, signal suppression 1415, signal combining 1418, OFDM decoding 1421 that comprises software or code can be embodied in any non-transitory computer-readable medium for use by or in connection with an instruction execution system such as, for example, a processor 1403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

In this disclosure, a suppressing alignment approach has been introduced to reduce the out-of-band (OOB) interference of orthogonal frequency division multiplexing (OFDM) systems. Suppressing alignment exploits the unavoidable redundancy provided by the cyclic prefix (CP) and the wireless communications channel to generate an OOB interference suppressing signal at the OFDM transmitter. However, after passing through the wireless channel, the suppressing signal is aligned with the CP duration at the OFDM receiver, essentially causing no interference to the data portion of the OFDM symbol. The suppressing alignment approach reduces the OOB interference by tens of decibels and does not require any change in the receiver structure of legacy OFDM.

This disclosure also discusses suppressing alignment for the joint reduction of the OOB power leakage and PAPR. The suppressing alignment approach exploits the temporal degrees of freedom provided by the cyclic prefix (CP), a necessary redundancy in OFDM systems, to generate a suppressing signal, that when added to the OFDM symbol, results in marked reduction in both the OOB power leakage and PAPR. Additionally, and in order to not cause any interference to the information data carried by the OFDM symbol, the suppressing alignment approach utilizes the wireless channel to align the suppressing signal with the CP duration at the OFDM receiver. Essentially, maintaining a bit error rate (BER) performance similar to legacy OFDM without requiring any change in the receiver structure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for out-of-band interference reduction of orthogonal frequency division multiplexing symbols, comprising:
    generating, by processing circuitry, a suppressing signal (c) based at least in part upon channel state information (CSI) of a wireless communication channel, the suppressing signal having a length equal to a length of an orthogonal frequency division multiplexing (OFDM) symbol (x) including a cyclic prefix (CP) and a data portion;
    combining, by the processing circuitry, the OFDM symbol (x) and the suppressing signal (c) to generate a transmission signal (t), where the length of the suppressing signal is aligned with the length of the OFDM symbol; and
    communicating the transmission signal (t) to a receiving device via the wireless communication channel, where communication of the transmission signal through the wireless communication channel reduces and substantially aligns the length of the suppressing signal with a length of the CP at the receiving device.

2. The method of claim 1, further comprising generating the OFDM symbol.

3. The method of claim 2, wherein the suppressing signal is further based upon an N-point discrete Fourier transformation matrix used to generate the OFDM symbol and a CP removal matrix used to remove the CP from the OFDM symbol at the receiving device.

4. The method of claim 1, further comprising receiving the CSI from the receiving device.

5. The method of claim 1, wherein the suppressing signal is further based upon an interference suppression vector (s) based at least in part upon minimization of out-of-band power leakage from the data portion of the OFDM symbol and out-of-band power leakage from the suppressing signal.

6. The method of claim 5, wherein the interference suppression vector (s) is further based upon minimization of peak-to-average power ratio of the OFDM symbol.

7. The method of claim 1, wherein power of the suppressing signal is about 25% or less than a power of the OFDM signal.

8. The method of claim 7, wherein power of the suppressing signal is about 10% or less than the power of the OFDM signal.

9. A method for out-of-band interference reduction of orthogonal frequency division multiplexing symbols, comprising:
    receiving, by processing circuitry, a transmitted signal communicated from a transmitting device via a wireless communication channel, the transmitted signal comprising a suppressing signal based at least in part upon channel state information (CSI) of the wireless communication channel and an orthogonal frequency division multiplexing (OFDM) symbol including a cyclic prefix (CP) and a data portion, where a length of the suppressing signal is initially aligned with a length of the OFDM symbol when communicated by the transmitting device and communication through the wireless communication channel reduces and substantially aligns the length of the suppressing signal with a length of the CP when received; and
    removing the CP and the suppressing signal from the transmitted signal using a CP removal matrix.

10. The method of claim 9, wherein the suppressing signal is further based upon the CP removal matrix and an N-point discrete Fourier transformation matrix used to generate the OFDM symbol.

11. The method of claim 9, further comprising providing the CSI to the transmitting device.

12. The method of claim 11, wherein a transmission power of the suppressing signal is about 10% or less than a transmission power of the OFDM signal.

13. An orthogonal frequency division multiplexing (OFDM) system, comprising:
    a transmitting device comprising:
        OFDM encoding circuitry configured to generate an OFDM symbol (x) including a cyclic prefix (CP) and a data portion;
        signal suppression circuitry configured to generate a suppressing signal (c) based at least in part upon channel state information (CSI) of a wireless communication channel, the suppressing signal having a length equal to a length of the OFDM symbol (x) including the CP and the data portion;
        combining circuitry configured to combine the OFDM symbol (x) and the suppressing signal (c) to generate a transmission signal (t) with the length of the suppressing signal aligned with the length of the OFDM symbol; and
        an antenna configured to communicate the transmission signal (t) to a receiving device via the wireless communication channel, where communication through the wireless communication channel reduces and substantially aligns the length of the suppressing signal with a length of the CP at the receiving device.

14. The OFDM system of claim 13, wherein the CSI is received from the receiving device.

15. The OFDM system of claim 13, wherein the suppressing signal is further based upon an N-point discrete Fourier transformation matrix used to generate the OFDM symbol and a CP removal matrix used to remove the CP from the OFDM symbol at the receiving device.

16. The OFDM system of claim 15, wherein the suppressing signal is further based upon an interference suppression vector (s) based at least in part upon minimization of out-of-band power leakage from the data portion of the OFDM symbol and out-of-band power leakage from the suppressing signal.

17. The OFDM system of claim 16, wherein the interference suppression vector (s) is further based upon minimization of peak-to-average power ratio of the OFDM symbol.

18. The OFDM system of claim 13, wherein power of the suppressing signal is about 25% or less than a power of the OFDM signal.

19. The OFDM system of claim 18, wherein power of the suppressing signal is about 10% or less than the power of the OFDM signal.

20. The OFDM system of claim 13, further comprising the receiving device, wherein the receiving device comprises:
    an antenna configured to receive the transmission signal via the wireless communication channel; and OFDM decoding circuitry configured to remove the CP and the suppressing signal from the transmitted signal using a CP removal matrix.

* * * * *